(12) United States Patent
Yamada et al.

(10) Patent No.: US 7,970,274 B2
(45) Date of Patent: Jun. 28, 2011

(54) DIAPHRAGM CONTROL APPARATUS OF INTERCHANGEABLE LENS CAMERA

(75) Inventors: Toshiaki Yamada, Saitama (JP); Shinichiro Sanada, Tokyo (JP); Kosei Kosako, Tokyo (JP); Yutaka Ohsawa, Tokyo (JP); Hirotaka Ueno, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/822,489

(22) Filed: Jun. 24, 2010

(65) Prior Publication Data

US 2010/0329665 A1    Dec. 30, 2010

(30) Foreign Application Priority Data

Jun. 25, 2009 (JP) ................................ 2009-151412
Jun. 18, 2010 (JP) ................................ 2010-139365

(51) Int. Cl.
 *G03B 7/10* (2006.01)
 *G03B 9/02* (2006.01)
(52) U.S. Cl. ....................................... 396/260; 396/508
(58) Field of Classification Search ................. 396/260, 396/508
 See application file for complete search history.

(56) References Cited

U.S. PATENT DOCUMENTS

| 5,768,639 | A * | 6/1998 | Ogasawara | 396/261 |
| 2007/0196083 | A1 * | 8/2007 | Yamamoto et al. | 396/48 |
| 2008/0170845 | A1 * | 7/2008 | Kurosawa | 396/133 |
| 2008/0199176 | A1 | 8/2008 | Kurosawa | |
| 2009/0263120 | A1 | 10/2009 | Kurosawa | |
| 2010/0220990 | A1 * | 9/2010 | Tsujiyama | 396/260 |
| 2010/0329658 | A1 * | 12/2010 | Yamada et al. | 396/260 |
| 2010/0329659 | A1 * | 12/2010 | Yamada et al. | 396/260 |

FOREIGN PATENT DOCUMENTS

JP    2008-197552    8/2008

OTHER PUBLICATIONS

U.S. Appl. No. 12/822,451 to Toshiaki Yamada et al., filed Jun. 24, 2010.
U.S. Appl. No. 12/822,457 to Toshiaki Yamada et al., filed Jun. 24, 2010.

* cited by examiner

*Primary Examiner* — Rodney E Fuller
(74) *Attorney, Agent, or Firm* — Greenblum & Bernstein, P.L.C.

(57) ABSTRACT

A diaphragm control apparatus in a camera body includes a stepping motor; a lead screw thereof, wherein a slider is driven by the lead screw; a position detector; and a controller. When driving the stepping motor by a predetermined number of steps in a direction to move the slider away from an origin position, the controller detects the slider position before driving the stepping motor stepwise as the origin position via the position detector, and thereafter detects a stepping position of the slider to compare the stepping position with the origin position each time the stepping motor is driven by one step, and counts the number of steps based from the moment at which the stepping position of the slider exceeds a predetermined position in the direction to move the slider away from the origin position against the biasing force of the resilient biaser.

9 Claims, 18 Drawing Sheets

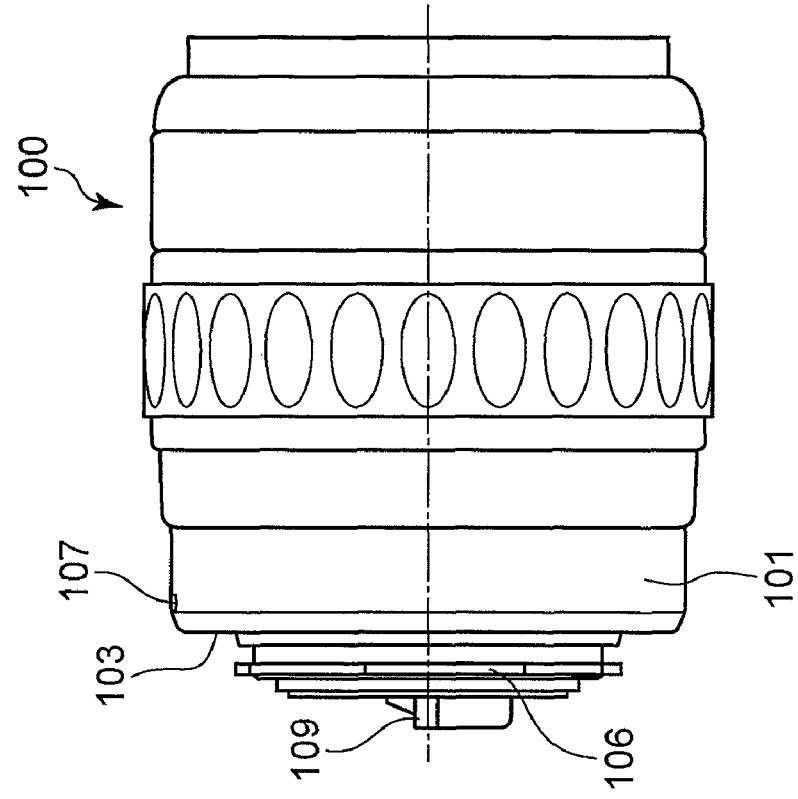
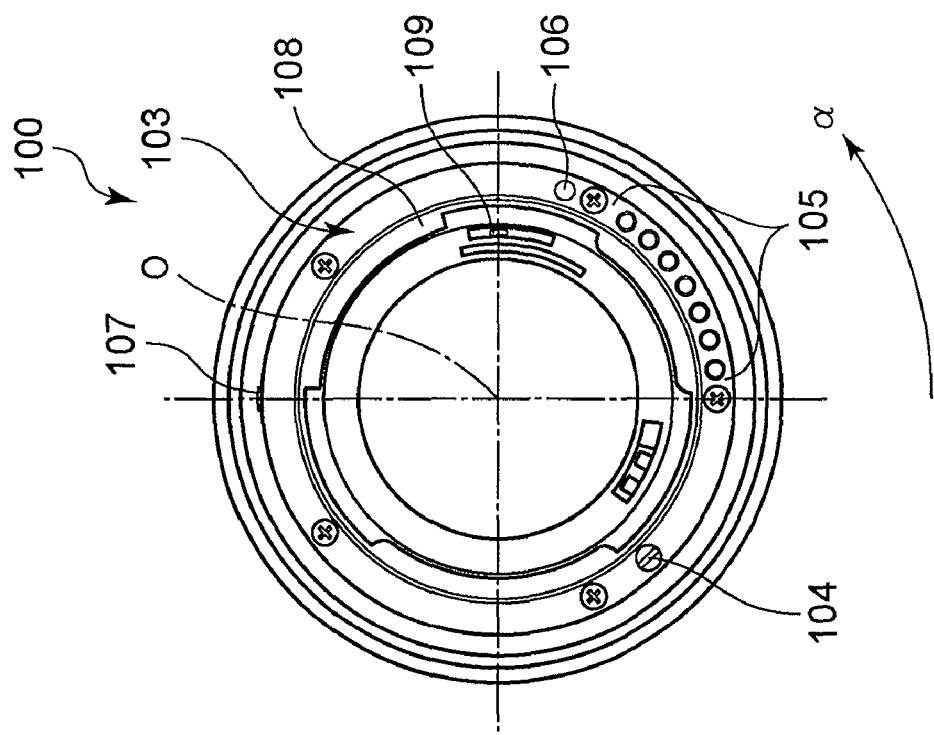
Fig. 2A
Fig. 2B

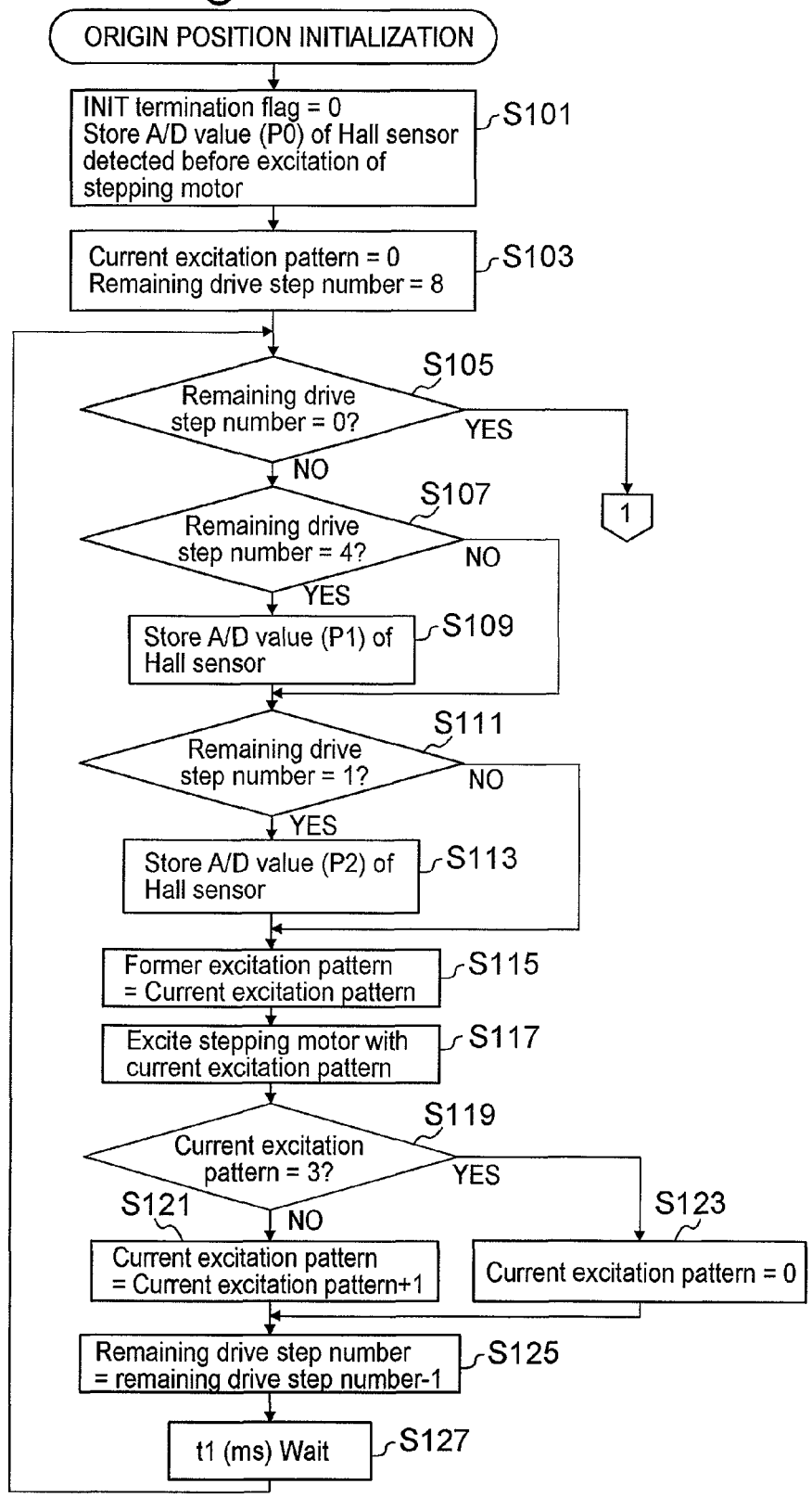

DIAPHRAGM CONTROL APPARATUS OF INTERCHANGEABLE LENS CAMERA

BACKGROUND OF THE INVENTION

The present invention relates to a diaphragm control apparatus of an interchangeable lens camera which enables an adjustable diaphragm of an interchangeable lens (attached to a camera body) to be controlled by the camera body during exposure.

DESCRIPTION OF THE RELATED ART

Diaphragm mechanisms (i.e., aperture mechanisms) of conventional interchangeable lens SLR camera systems are configured in a manner so that a diaphragm control bar, which constitutes an element of a diaphragm control mechanism of a camera body, moves a diaphragm operatively-associated rod of the interchangeable lens that is provided to drive a diaphragm mechanism of the interchangeable lens. In the case where the diaphragm control mechanism is powered by a motor of a mirror drive mechanism or a shutter charge mechanism, the diaphragm can be controlled only in a single direction due to the structure of the diaphragm control mechanism. For instance, the diaphragm control mechanism controls the operation of the diaphragm in such a manner as to drive the diaphragm in a diaphragm stop-down direction from an open-aperture (full-aperture) state and subsequently stops the stop-down movement of the diaphragm with a ratchet when the diaphragm is stopped down to a previously-set aperture value (i.e., f-number), and accordingly, the f-number of the diaphragm cannot be adjusted afterwards.

In such conventional diaphragm mechanisms, when a live-view operation, in which image data obtained from an image sensor (image pickup device) is displayed on a display monitor in real time, or a movie shooting operation is performed, the f-number cannot be adjusted from an initially-set f-number.

In order to enable an f-number adjustment during a live-view operation, the assignee of the prevent invention has proposed an invention for controlling the operation of an adjustable diaphragm so as to open and shut the adjustable diaphragm with the use of a diaphragm drive motor serving as a driving source of a diaphragm control mechanism (Japanese Unexamined Patent Publication 2008-197552). This related invention makes it possible to make an adjustment to a diaphragm setting during a live-view operation or a movie shooting operation.

In conventional interchangeable lenses, the open-aperture reference position of the diaphragm operatively-associated rod varies depending on the f-number at open aperture. Therefore, when an interchangeable lens is attached to a camera body, the amount of movement of the diaphragm control rod, which is provided in the camera body, by the diaphragm operatively-associated rod varies depending on the type of interchangeable lens attached to the camera body. In the case where a stepping motor is used as a driving source of the diaphragm control mechanism, the stepping motor is forced to rotate in association with movements of the diaphragm control rod; however, the amount of rotation of the stepping motor varies depending on the type of interchangeable lens attached to the camera body. As a result, the stepping motor (the rotor thereof) rotates from the initial detent position thereof, making the stop position of the stepping motor uncertain. Additionally, in conventional interchangeable lenses, it is sometimes the case that the open-aperture reference position of the diaphragm operatively-associated rod, i.e., the initial position thereof relative to a camera body when an interchangeable lens is attached to the camera body, may be erroneous due to mechanical error or assembling error, etc. In such a case also, due to this positional error, it is sometimes the case that the stop position of the stepping motor deviates from the preset initial position thereof.

Stepping motors that can be utilized as diaphragm drive motors are usually of a type which is driven to rotate by steps in one direction, normally by being repeatedly energized with a plurality of excitation patterns in order. In this type of stepping motor, if the stop position and the phase of the excitation pattern do not coincide with each other, a problem occurs with the stepping motor possibly rotating in a direction reverse to the required rotational direction, or even not rotating at all, which causes a mismatch between the number of excitations and the number of steps for driving the stepping motor, thus causing an error in f-number control. In particular, in the case where a diaphragm control value (f-number) is set by the number of steps for driving the stepping motor, there is a possibility of the number of steps by which the stepping motor has been driven and the moving amount of the diaphragm operatively-associated rod from the origin position thereof not coinciding with each other, thus causing an error in the f-number.

SUMMARY OF THE INVENTION

The present invention has been devised in view of the above described problems of the prior art and provides a diaphragm control apparatus of an interchangeable lens camera, wherein the diaphragm control apparatus makes it possible to perform continuous diaphragm control during exposure even if an interchangeable lens equipped with a diaphragm operatively-associated rod is attached to the camera body and wherein, even if a stepping motor is used as a motor for diaphragm drive control, the diaphragm control apparatus makes it possible to control the f-number with precision by the number of steps for driving the stepping motor.

According to an aspect of the present invention, a diaphragm control apparatus is provided, incorporated in a camera body, to which an interchangeable lens provided with a diaphragm apparatus is detachably attached, the diaphragm apparatus including a diaphragm operatively-associated rod for driving an adjustable diaphragm to open and shut the adjustable diaphragm, and the diaphragm control apparatus including a slider that is driven to move the diaphragm operatively-associated rod. The diaphragm control apparatus includes a diaphragm control mechanism including a stepping motor and a lead screw which is driven to rotate by the stepping motor, wherein the slider is moved by rotation of the lead screw; a resilient biaser which biases the slider toward an initial position at a movement extremity of the slider, wherein the slider is allowed to move to an initial position corresponding to an initial position of the diaphragm apparatus via the diaphragm operatively-associated rod by rotating the lead screw and the stepping motor when the stepping motor is in a free state with the interchangeable lens attached to the camera body; a position detector for detecting a position of the slider; and a controller which excites the stepping motor to rotate the stepping motor stepwise by repeating a plurality of excitation patterns. When driving the stepping motor by a predetermined number of steps in a direction to move the slider away from the origin position against a biasing force of the resilient biaser, the controller detects a position of the slider before driving the stepping motor stepwise as the origin position via the position detector, and thereafter detects a stepping position of the slider to compare the stepping position with the origin position each time the stepping motor is driven by one step, and counts the number of steps based from the moment at which the stepping position of the slider exceeds a predetermined position in the direction to move the slider away from the origin position against the biasing force of the resilient biaser.

It is desirable for the predetermined position in the direction to move the slider away from the origin position to be located at a position less than a predetermined distance from the origin position, the predetermined distance being shorter than a moving distance of the slider per one step of the stepping motor.

It is desirable for the controller to determine the moving distance of the slider per one step of the stepping motor based on positions of the slider detected via the position detector while moving the slider stepwise away from the origin position against the biasing force of the resilient biaser or toward the origin position.

It is desirable for the predetermined position in the direction to move the slider away from the origin position to be located at a position less than a predetermined distance from the origin position, the predetermined distance being shorter than two-tenths through four-tenths of a moving distance of the slider per one step of the stepping motor.

It is desirable for the controller to determine the moving distance of the slider per one step of the stepping motor based on positions of the slider detected via the position detector while moving the slider stepwise away from the origin position against the biasing force of the resilient biaser or toward the origin position.

It is desirable for the controller to set the initial excitation pattern for a subsequent diaphragm control based on the excitation pattern of the stepping motor when the slider exceeds a predetermined position.

It is desirable for the position detector to include at least one magnet and a Hall sensor.

It is desirable for the slider to be supported by a slide shaft that extends parallel to the lead screw so that the slider is freely slidable thereon, and for the magnet to be installed onto the slider at a position between the lead screw and the slide shaft.

It is desirable for the diaphragm apparatus of the interchangeable lens to include a diaphragm ring, positioned coaxially with an optical axis of the interchangeable lens to be rotatable about the optical axis, the diaphragm operatively-associated rod being integrally formed with the diaphragm ring to project rearward from a rear end of the interchangeable lens, and for the diaphragm ring to be continuously biased by a biaser in a direction to stop down an aperture formed by diaphragm blades of the diaphragm apparatus.

According to the present invention, the slider can be precisely moved by a designated number of steps because the controller counts the predetermined number of steps, based from the moment at which the stepping position of the slider exceeds a predetermined position in the direction to move the slider away from the origin position.

The present disclosure relates to subject matter contained in Japanese Patent Application No. 2009-151412 (filed on Jun. 25, 2009) and Japanese Patent Application No. 2010-139365 (filed on Jun. 18, 2010) which are expressly incorporated herein by reference in their entireties.

BRIEF DESCRIPTION OF THE DRAWINGS

The present invention will be discussed below in detail with reference to the accompanying drawings, in which:

FIG. 2A is a rear elevational view of an interchangeable lens that is attachable to the camera body and is provided with a diaphragm interlocking rod;

FIG. 2B is a side elevational view of the interchangeable lens shown in FIG. 2A;

FIGS. 11A and 11B show a flow chart showing operations of the origin-position initialization process for the diaphragm control mechanism;

DESCRIPTION OF THE PREFERRED EMBODIMENT

Figure 1:
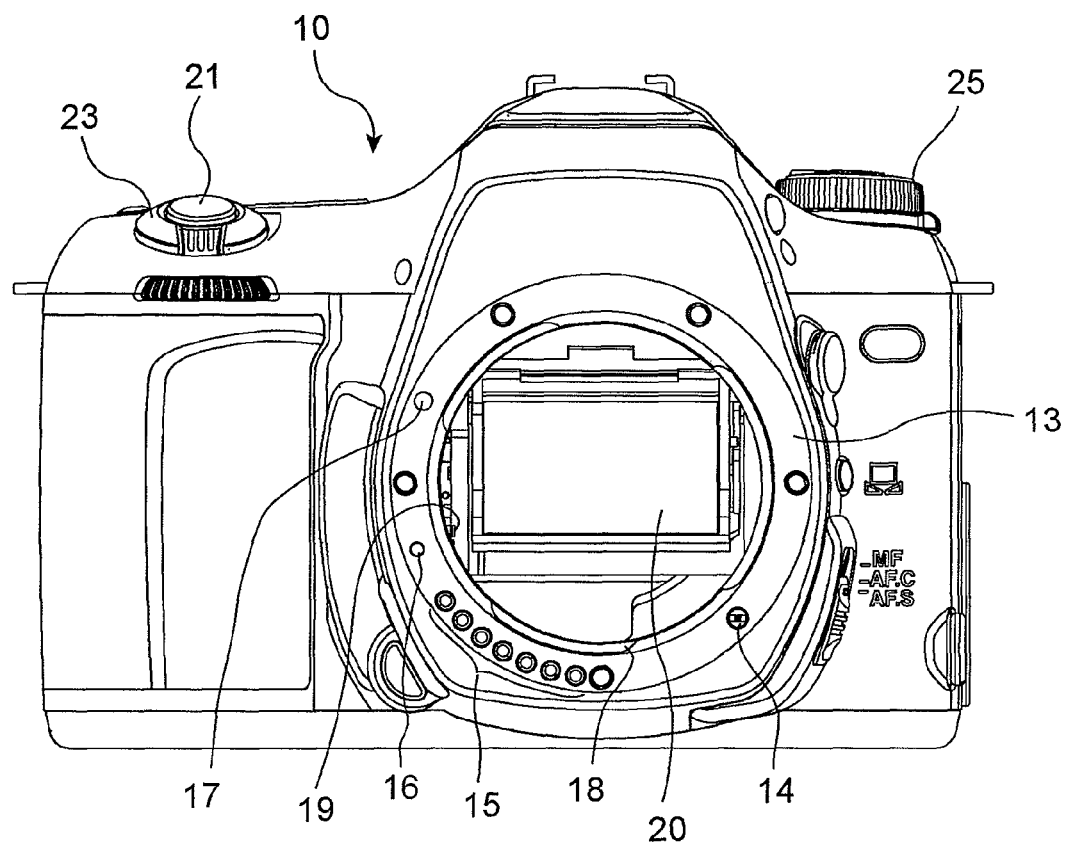
FIG. 1 is a front elevational view of a camera body of an SLR camera system according to the present invention.

An embodiment of an SLR camera system according to the present invention is provided with a camera body 10 and an interchangeable lens (photographic lens) 100 that is detachably attached to the camera body 10. A body mount (mount ring) 13 is fixed to an approximate center of the front of the camera body 10. The camera body 10 is provided on the surface of the body mount 13 with an AF coupler 14, a group of information contacts 15, a lock pin 16 and a mount index mark 17. The camera body 10 is provided on an inner periphery of the body mount 13 with a bayonet mount 18. The camera body 10 is provided in a mirror box thereof with a main mirror 20, and is provided, on the left hand side of the main mirror 20 with respect to FIG. 1 in the vicinity of the bayonet mount 18, with a diaphragm control rod 19 for controlling movements of a diaphragm operatively-associated rod 109 of the interchangeable lens 100 (see FIGS. 2A and 2B).

The camera body 10 is provided, on the top left thereof with respect to FIG. 1, with a shutter release button 21, and is provided around the shutter release button 21 with a rotary ring-shaped power switch 23. The camera body 10 is provided, on top right thereof with respect to FIG. 1, with a mode dial 25.

The power switch 23 is structured to be manually rotatable. The power switch 23 is click-stopped at the power OFF position and at the power ON position, and can be turned to a live-view position (set on the opposite side of the power ON position from the power OFF position) against a spring biasing force. If the power switch 23 is further turned toward the live-view position from the power ON position, the live-view switch is turned ON while the power remains switched ON.

The mode dial 25 is a rotary switch which stops with a tactile click at each of a plurality of different stop positions. Various exposure modes such as a still-image photographing mode and a movie recording mode can be selected (switched) according to the click-stop position of the mode dial 25.

The interchangeable lens 100 is provided at the rear end thereof with a lens mount ring 103. The interchangeable lens 100 is provided on the surface of the lens mount ring 103 with an AF coupler 104, a group of information contacts 105 and a lock hole 106 which correspond to the AF coupler 14, the group of information contacts 15 and the lock pin 16, respectively, that are provided on the surface of the body mount 13. The interchangeable lens 100 is provided on an inner periphery of the lens mount ring 103 with a bayonet mount 108. The interchangeable lens 100 is further provided immediately inside (radially inside) an inner peripheral surface of the bayonet mount 108 with the diaphragm operatively-associated rod 109 that is interlocked with the diaphragm control rod 19 of the camera body 10 when the interchangeable lens 100 is properly mounted onto the camera body 10. The interchangeable lens 100 is provided thereon with amount index mark 107 which corresponds to the mount index mark 17 of the camera body 10.

When the interchangeable lens 100 is attached to the camera body 10, the bayonet mounts 18 and 108 are brought into engagement with each other with the mount index marks 17 and 107 being aligned with each other, and subsequently the interchangeable lens 100 is rotated clockwise relative to the camera body 10 as viewed from front of the camera body 10. This clockwise rotation of the interchangeable lens 100 relative to the camera body 10 causes the diaphragm operatively-associated rod 109 of the interchangeable lens 100 to come into contact with the diaphragm control rod 19 of the camera body 10; a further clockwise rotation of the interchangeable lens 100 causes the diaphragm control rod 19 to move due to the engagement of the diaphragm control rod 19 with the diaphragm operatively-associated rod 109; and a subsequently further clockwise rotation of the interchangeable lens 100 causes the lock pin 16 to be engaged in the lock hole 106 with a click at a locked position, whereby the interchangeable lens 100 stops rotating relative to the camera body 10 so that the interchangeable lens 10 becomes properly mounted onto the camera body 10. In this locked position, the diaphragm operatively-associated rod 109 abuts against one end of the moving range thereof, thus being prevented from moving. This position of the diaphragm operatively-associated rod 109 corresponds to the open-aperture reference position thereof. On the other hand, the diaphragm control rod 19 has been forcibly moved from the initial position thereof to a position corresponding to the open-aperture reference position of the diaphragm operatively-associated rod 109. In a state where the interchangeable lens 100 is locked in this locked position, the AF coupler 104 is engaged with the AF coupler 14, and the group of information contacts 105 is in electrical contact with the group of information contacts 15.

Figure 3:
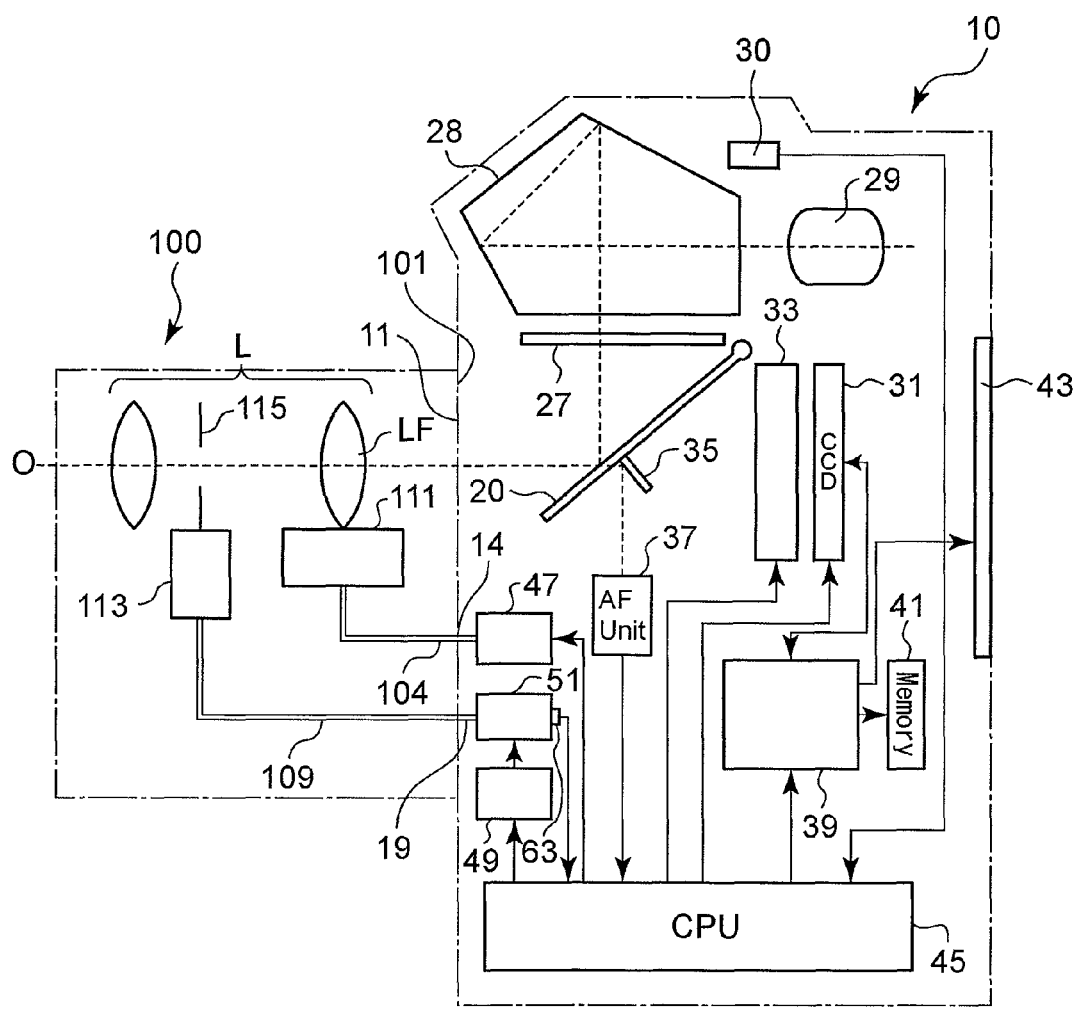
FIG. 3 is a block diagram showing main elements of the SLR camera system with the interchangeable lens attached to the camera body.

FIG. 3 is a schematic block diagram showing main elements of the camera body 10 and the interchangeable lens 100 that is attached to the camera body 10. The camera body 10 is provided above the main mirror 20 with a focusing screen 27, a pentagonal prism 28 and an eyepiece 29, which serve as elements of an optical viewfinder through which an object image formed through the interchangeable lens 100 is viewed. The camera body 10 is provided in the vicinity of the eyepiece 29 with a photometering element 30 for measuring object brightness.

The camera body 10 is provided behind the main mirror 20 with an image sensor (image pickup device) 31, such as a CCD image sensor which receives object light upon the main mirror 20 being raised to the retracted position (mirror-up position) to capture an object image, and is provided immediately in front of the image sensor 31 with a shutter mechanism 33. The camera body 10 is provided, immediately behind a half-mirror portion formed at a central portion of the main mirror 20, with a sub-mirror 35 which reflects incident object light downward. The camera body 10 is provided, below the sub-mirror 35 at the bottom of the mirror box, with an AF unit 37 which receives the object light reflected by the sub-mirror 35 to detect a focus state. The AF unit 37 is a so-called TTL phase-difference detector that outputs a pair of object image signals, which are obtained by pupil splitting, as AF data. A CPU (controller) 45 provided in the camera body 10 calculates a defocus amount from this AF data, and further calculates data necessary for moving a focusing lens group of the interchangeable lens attached to the camera body 10.

The camera body 10 is provided therein with a signal processor 39. The signal processor 39 processes image signals obtained by an image capturing operation of the image sensor 31, compresses or does not compress the processed image signals, and stores the image signals thus compressed or not compressed in an image memory 41 provided in the camera body 10. The camera body 10 is provided on the back thereof with a display 43 (e.g., an LCD panel) which displays captured images. The image displaying operation of the display 43 is controlled by the signal processor 39.

The camera body 10 is provided with an AF system 47 and a diaphragm control mechanism (diaphragm control apparatus) 51. The AF system 47 drives an AF mechanism 111 of the interchangeable lens 100, and the diaphragm control mechanism 51 controls the operation of a diaphragm apparatus 113 of the interchangeable lens 100. The AF system 47 incorporates an AF motor (not shown) and transmits rotation of this AF motor to the AF mechanism 111 of the interchangeable lens 100 via the AF couplers 14 and 104. The operation of this AF motor is controlled by the CPU 45, and the AF mechanism 111 moves a focusing lens group LF of a photographing optical system L (see FIG. 3) of the interchangeable lens 100 to an in-focus position. The operation of the diaphragm control mechanism 51 is controlled by the CPU 45 via a diaphragm drive circuit 49 provided in the camera body 10 to drive the diaphragm control rod 19.

In addition, photometric data output from the photometering element 30 and AF data output from the AF unit 37 are input to the CPU 45. Based on such data, the CPU 45 calculates appropriate data for the f-number and appropriate lens drive data for focusing, drives the diaphragm control mechanism 51 via the diaphragm drive circuit 49 in accordance with the calculated data on f-number, and drives the AF system 47 in accordance with the calculated lens drive data.

The diaphragm apparatus 113 of the interchangeable lens 100 operates to adjust the amount of light passing through a diaphragm aperture formed by a plurality of diaphragm blades 115 by opening and shutting the plurality of diaphragm blades 115. The diaphragm apparatus 113 is provided with the diaphragm operatively-associated rod 109, as described above, and the opening and shutting operation of the plurality of diaphragm blades 115 is controlled via the diaphragm operatively-associated rod 109.

[Diaphragm Control Mechanism]

Figure 4:
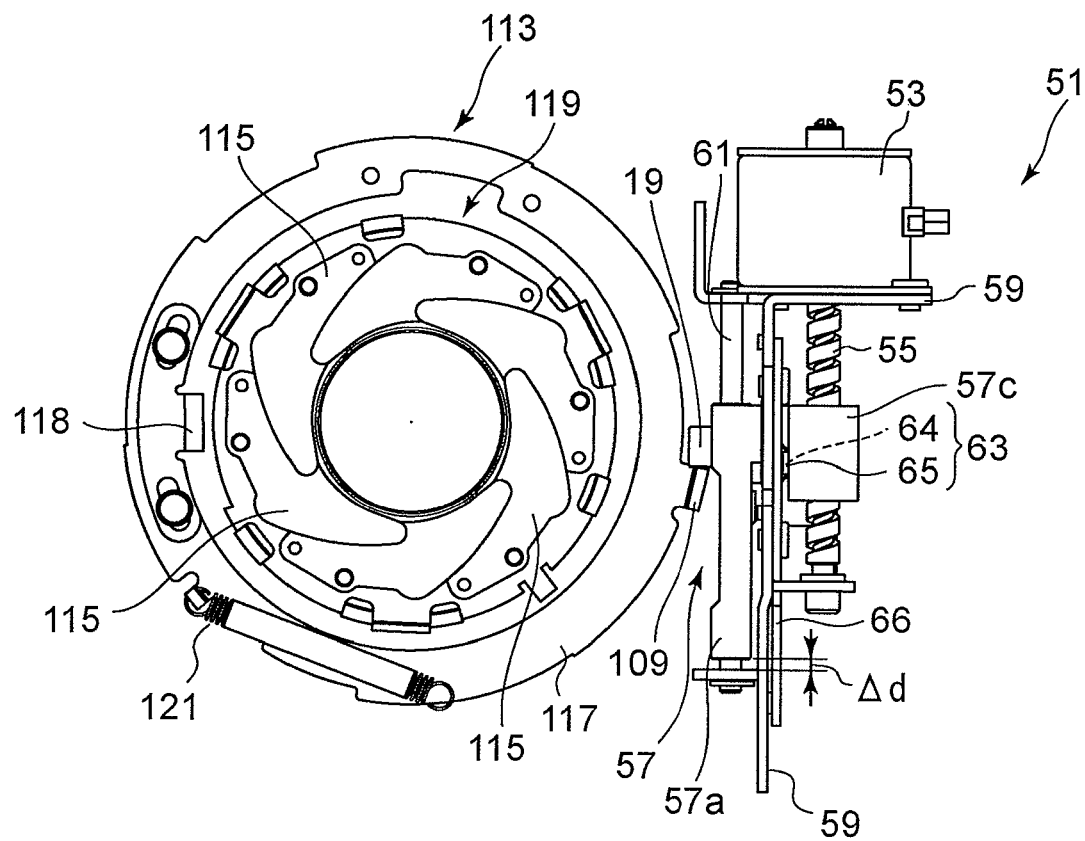
FIG. 4 is a rear elevational view, as viewed from the camera body side of a diaphragm control mechanism of the camera body and main elements of a diaphragm apparatus provided in the interchangeable lens, showing the diaphragm control mechanism and the diaphragm apparatus in a full-aperture state.
Figure 5:
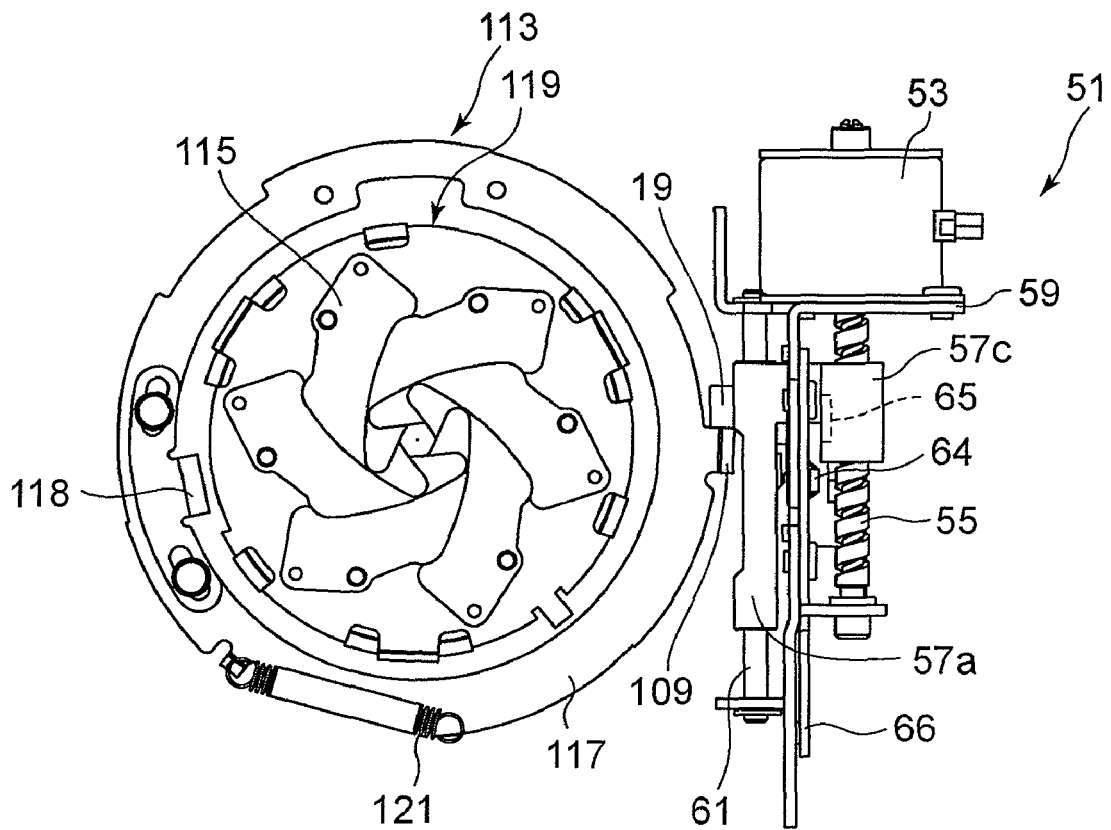
FIG. 5 is a view similar to that of FIG. 4, showing the diaphragm control mechanism and the diaphragm apparatus in a fully stopped-down state.
Figure 6A:
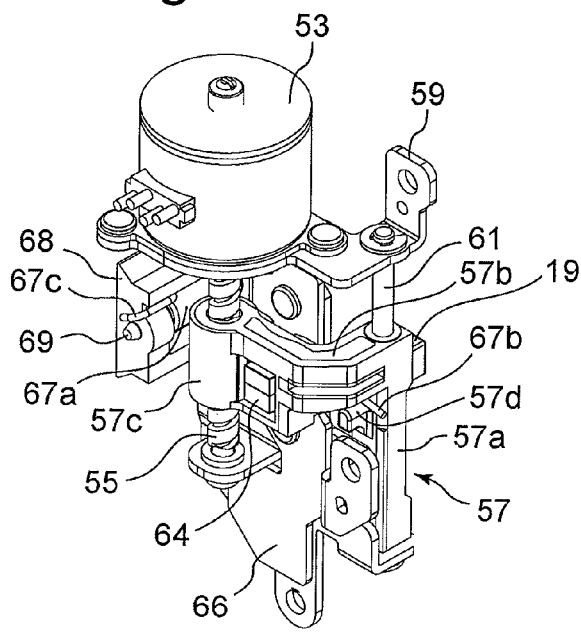
FIGS. 6A and 6B are perspective views of the diaphragm control mechanism of the camera body with the diaphragm apparatus in an open-aperture state, viewed obliquely from the front left-hand side and the front right-hand side, respectively.
Figure 6B:
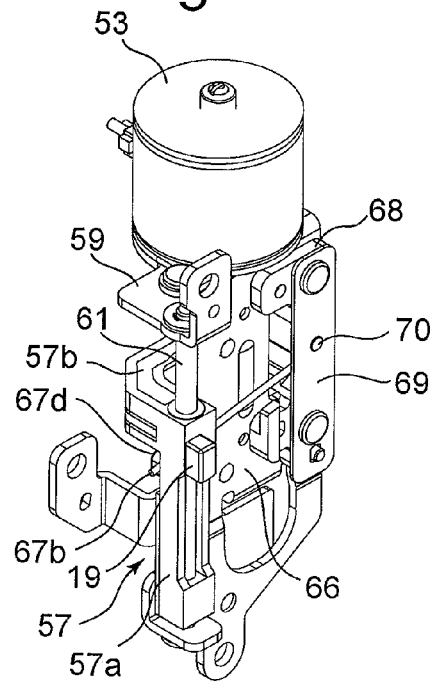
Figure 7A:
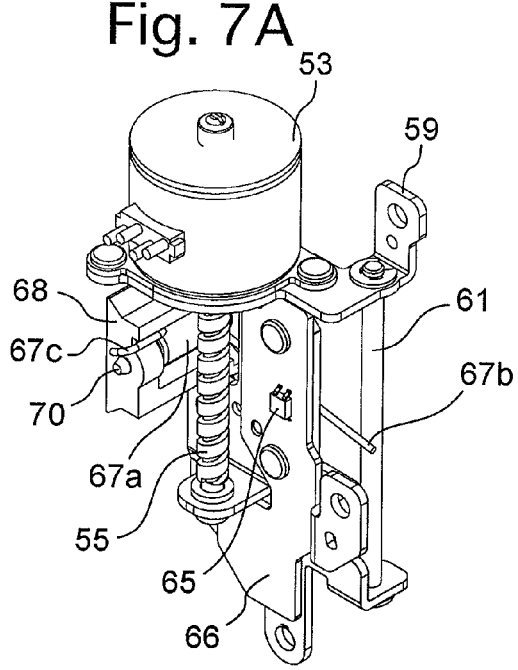
FIGS. 7A and 7B are perspective views of the diaphragm control mechanism of the camera body with a slider which constitutes an element of the diaphragm control mechanism being removed for clarity, viewed obliquely from the front left-hand side and the front right-hand side, respectively.
Figure 7B:
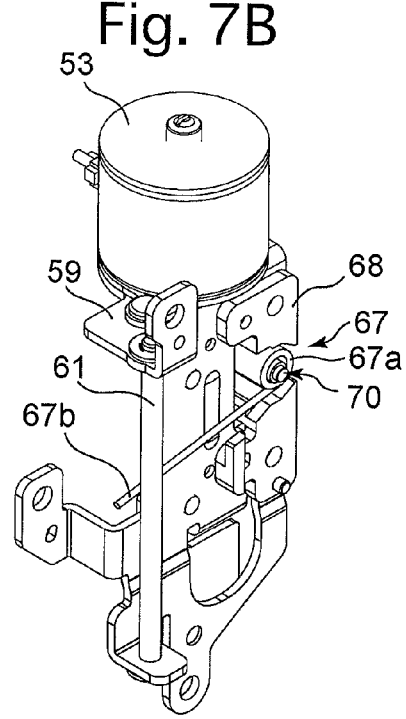
Figure 8:
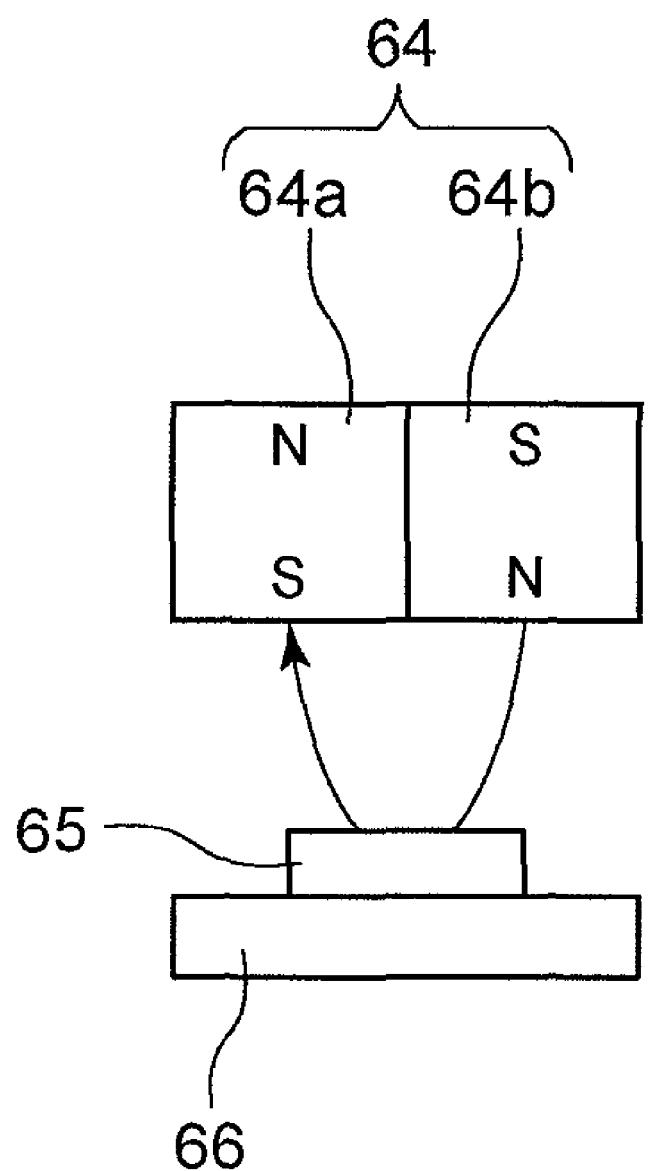
FIG. 8 is a schematic side view of an embodiment of a position detector, composed of a Hall sensor and a pair of magnets, incorporated in the diaphragm control mechanism for detecting the initial position of the slider of the diaphragm control mechanism.

The structures of the diaphragm control mechanism 51 of the camera body 10 and the diaphragm apparatus 113 of the interchangeable lens 100 will be discussed in detail with reference to FIGS. 4 through 8. FIG. 4 is a rear elevational view of the diaphragm control mechanism 51 and main elements of the diaphragm apparatus 113 in a full-aperture state; FIG. 5 is a rear elevational view of the diaphragm control mechanism 51 and main elements of the diaphragm apparatus 113 in a fully stopped-down state; FIG. 6A is a perspective view of the diaphragm control mechanism 51 with the diaphragm apparatus 113 in an open-aperture state, viewed obliquely from the front left-hand side; FIG. 6B is a perspective view of the diaphragm control mechanism 51 with the diaphragm apparatus 113 in an open-aperture state, viewed obliquely from the front right-hand side; FIG. 7A is a perspective view of the diaphragm control mechanism 51 with a slider 57 which constitutes an element of the diaphragm control mechanism 51 being removed for clarity, viewed obliquely from the front left-hand side; FIG. 7B is a perspective view of the diaphragm control mechanism 51 with the slider 57 being removed for clarity, viewed obliquely from the front right-hand side; and FIG. 8 is a schematic diagram showing an embodiment of a position detector (composed of a Hall sensor and a pair of permanent magnets) for detecting an origin position of the slider 57.

The diaphragm control mechanism 51 is provided with a stepping motor 53, as a driving source thereof, which has a lead screw 55 as a rotary shaft. Namely, the lead screw 55 rotates integrally with the rotor of the stepping motor 53. The stepping motor 53 is fixed to a frame (stationary member) 59, and the end (lower end with respect to FIGS. 4 through 7B) of the lead screw 55 is supported by a lug, projecting from the frame 59, so that the lead screw 55 is freely rotatable about the axis thereof. The frame 59 is fixed to a stationary frame (not shown) of the camera body 10.

A screw nut 57c formed at an end of an arm 57b extending from the slider 57 is screw-engaged with the lead screw 55. The slider 57 is provided in a main body 57a thereof with a shaft hole in which a slide shaft 61 is slidably fitted, so that the slider 57 is supported by the slide shaft 61 to be freely slidable thereon. Both ends of the slide shaft 61 are supported by the frame 59 (an upper portion of the frame 59 and a lower lug projected from the frame 59) so that the slide shaft 61 extends parallel to the lead screw 55. The diaphragm control rod 19 is formed to project integrally from the main body 57a of the slider 57, thus moving integrally with the slider 57.

The diaphragm control mechanism 51 can drive the stepping motor 53 stepwise to rotate the lead screw 55 stepwise. Namely, the diaphragm control mechanism 51 can integrally move the slider 57 and the diaphragm control rod 19, together with the screw nut 57c, stepwise in very small length units determined by a one-step rotational angle (rotational angle by one excitation step) and the lead of the lead screw 55. The moving range of the diaphragm control rod 19 in the present embodiment ranges from the movement extremity thereof (one end of the moving range thereof on the open-aperture side of an initial position/open-aperture-side movable limit), shown in FIG. 4, at which one end of the slider 57 (in the sliding direction thereof) comes in contact with a limit portion of the frame 59, to the other end of the moving range on the fully stopped-down side (stop-down-side movable limit), at which the other end of the slider 57 (in the sliding direction thereof) comes in contact with the other limit portion of the frame 59. FIG. 5 shows the fully stopped-down position of the interchangeable lens 100, and the slider 57 can further move upward from the position shown in FIG. 5 until the aforementioned other end of the slider 57 comes into contact with the aforementioned another limit portion of the frame 59.

The diaphragm control mechanism 51 is provided with a biasing spring (resilient biaser) 67 as a resilient biaser which biases the slider 57 in a direction toward the origin position (the open-aperture-side movable limit). The biasing spring 67 is configured from a torsion spring that is provided with a coiled portion 67a at a middle part thereof. The coiled portion 67a of the biasing spring 67 is fitted on a mount pin 70 which projects from a mount (stationary member) 68. The mount 68 is fixed to the frame 59 via a mount plate 69. One end 67b of the biasing spring 67 that extends from the coiled portion 67a is engaged with an engaging portion 57d, which projects from the slider 57, while the other end 67c of the biasing spring 67 that also extends from the coiled portion 67a is engaged with the mount 68 so that the slider 57 is continuously biased toward the aperture opening direction (downward direction with respect to FIG. 4). The slider 57 can move by the biasing force of the biasing spring 67 to the open-aperture-side movable limit, at which the slider 57 is mechanically prevented from moving beyond the open-aperture-side movable limit, by rotating the lead screw 55 and the stepping motor 53 in a state (free state) where no current is passed through the stepping motor 53. Even with the interchangeable lens 100 mounted to the camera body 10, the biasing force of the biasing spring 67 is predetermined to be normally capable of moving the slider 57 to the open-aperture-side movable limit against the biasing force of a diaphragm spring (extension coil spring/biaser) 121 (see FIGS. 4 and 5) of the interchangeable lens 100, and to allow the stepping motor 53 to move the slider 57 to the stop-down-side movable limit.

The slider 57 is mechanically prevented from moving from the open-aperture-side movable limit (the initial position) by the biasing force of the biasing spring 67 when no interchangeable lens is attached to the camera body 10; therefore, the stop position of the stepping motor 53 is also constant. The interchangeable lens 100 is mounted to the camera body 10 by being manually rotated in a direction shown by the arrow α in FIG. 2A (counterclockwise direction with respect to FIG. 2A) with respect to the camera body 10. In this mounting operation, the diaphragm operatively-associated rod 109 comes in contact with the diaphragm control rod 19 and the counterclockwise rotation of the interchangeable lens 100 with respect to the camera body 10 causes the diaphragm control rod 19 and the slider 57 to move to positions thereof corresponding to the open-aperture reference position of the diaphragm operatively-associated rod 109 (to the positions shown in FIG. 4). Namely, since the diaphragm operatively-associated rod 109 stops at the open-aperture reference position thereof, where the diaphragm operatively-associated rod 109 is mechanically prevented from moving, the diaphragm control rod 19 which is in contact with the diaphragm operatively-associated rod 109 is moved with the slider 57 in a diaphragm stop-down direction (direction to stop down the diaphragm mechanism 119) against the biasing force of the biasing spring 67. As shown in FIG. 4, the diaphragm control rod 19 (the slider 57) in the present embodiment has been moved by a displacement Δd from the initial position to the origin position in the diaphragm stop-down direction (upward direction with respect to FIG. 4). Due to this movement of the diaphragm control rod 19, the stepping motor 53 has been rotated by a rotation angle corresponding to the displacement Δd divided by the lead of the lead screw 55. Therefore, when the interchangeable lens 100 is attached to the camera body 10, the stop position of the stepping motor 53, which serves as an origin position (initial excitation pattern of the stop position) thereof, becomes unclear.

If the origin position of the stepping motor 53 becomes unclear, it becomes unclear as to which excitation pattern (NO.) the stepping motor 53 should commence to be excited from, in order to rotate the stepping motor 53 stepwise from the first excitation. In the present embodiment of the SLR camera system, an appropriate first excitation phase can be set by detecting the position at which the stepping motor 53 thus forced to rotate is currently at rest, and by detecting the excitation pattern (NO.) from which the stepping motor 53 should commence to be excited; i.e., by detecting the origin position of the stepping motor 53. Features of this embodiment will be discussed hereinafter.

The diaphragm control mechanism 51 is provided with a pair of magnets 64 (64a and 64b) and a Hall sensor 65 (see FIG. 8) that serve as elements of an origin position detection sensor (position detector) 63 for detecting the origin position of the slider 57. The magnets 64a and 64b are fixed to the arm 57b of the slider 57, which is provided between the lead screw 55 and the slide shaft 61, and the Hall sensor 65 is mounted on a sensor board 66 that is fixed to the frame 59. If the origin position detection sensor 63 uses a Hall element having an auto-compensation function, the influences and errors caused by environmental conditions and secular changes can be minimized.

The Hall sensor 65 senses a magnetic force from the magnets 64 (64a and 64b) and outputs a voltage according to this magnetic force. The CPU 45 detects the position of the magnets 64a and 64b, i.e., the position of the slider 57, and hence, the position of the diaphragm control rod 19, in accordance with a detection signal output from the Hall sensor 65. Since the Hall sensor 65 outputs a detection signal according to the distance from the Hall sensor 65 to the pair of magnets 64a and 64b, the relative distance between the Hall sensor 65 and the pair of magnets 64a and 64b can be detected within a predetermined range. The magnets 64a and 64b and the Hall sensor 65 are arranged so as to detect an origin position of the slider 57 corresponding to the open-aperture reference position of the diaphragm operatively-associated rod of the interchangeable lens equipped with the slider 57.

FIG. 8 schematically shows the structure of an embodiment of the origin position detection sensor 63 of the diaphragm control mechanism 51. In this drawing, the leftward/rightward direction corresponds to the moving direction of the pair of magnets 64a and 64b.

In the embodiment shown in FIG. 8, the two magnets 64a and 64b are joined together and arranged along the moving direction thereof so that opposite poles of the two magnets 64a and 64b face the Hall sensor 65. According to this structure, a magnetic force of the two magnets 64a and 64b exits out of the center of the surface of the N-pole of the magnet 64b which faces the Hall sensor 65 and enters into the center of the surface of the S-pole of the magnet 64a which faces the Hall sensor 65, as shown in FIG. 8; and accordingly, the magnetic force changes abruptly in the relative moving direction (horizontal direction as viewed in FIG. 8), and the sensitivity of the origin position detection sensor 63 becomes acute. It is possible for a single ferromagnetic material to be divided into two and for each ferromagnetic material thereof to be magnetized in a direction orthogonal to the relative moving direction.

The diaphragm apparatus 113 of the interchangeable lens 100 is provided with a diaphragm ring 117, the diaphragm operatively-associated rod 109, a linkage rod 118 and a diaphragm mechanism 119. The diaphragm ring 117 rotates about an optical axis O of the interchangeable lens 100. The diaphragm operatively-associated rod 109 of the diaphragm apparatus 113, which is engageable with the diaphragm control rod 19 of the camera body 10, projects rearward (toward the camera body 10) from the outer edge of the diaphragm ring 117. The linkage rod 118 projects from the inner edge of the diaphragm ring 117 toward the object side to extend parallel to the optical axis O. The diaphragm mechanism 119 is provided with a plurality of diaphragm blades (aperture blades) 115. The diaphragm mechanism 119 is a conventional type which drives the plurality of diaphragm blades 115 so that they open and shut by receiving a rotational movement of the linkage rod 118. In addition, the diaphragm ring 117 is biased to rotate in a direction to stop down the plurality of diaphragm blades 115 by the diaphragm spring 121.

When the camera body 10 is in a natural state and without the interchangeable lens 100 being mounted thereto, the plurality of diaphragm blades 115 (diaphragm ring 117) are fully stopped down by the biasing force of the diaphragm spring 121, the diaphragm ring 117 is rotatably biased toward the fully stopped down position, which is a mechanical rotational limit to which a stopper (not shown) abuts, and the diaphragm ring 117 is held at this fully stopped down position. When the interchangeable lens 100 is mounted to the camera body 10, in which the interchangeable lens 100 is rotated relative to the camera body 10, the diaphragm operatively-associated rod 109 is rotated in the opening direction against the biasing force of the diaphragm spring 121 via the diaphragm control rod 19; thereafter, upon the interchangeable lens 100 being further rotated relative to the camera body 10 until the interchangeable lens 100 becomes properly mounted onto the camera body 10 at the locked position, the diaphragm ring 117 stops at the open-aperture reference position (initial position), which is a mechanical rotational limit to which a stopper (not shown) abuts, and the diaphragm ring 117 is held thereat. As described above, the slider 57, which is integral with the diaphragm control rod 19 of the camera body 10, is moved from the initial position in the diaphragm stop-down direction and held at a position (origin position) corresponding to the open-aperture reference position.

With the above described structure, when no interchangeable lens is attached to the camera body 10 or when the diaphragm operatively-associated rod 109 is in a free state, the diaphragm apparatus 113 of the interchangeable lens 100 is in a state such that the plurality of diaphragm blades 115 of the diaphragm mechanism 119 are fully stopped down by the resilient biasing force of the diaphragm spring 121.

On the other hand, in a state where the interchangeable lens 100 is attached to the camera body 10, e.g., in an initial state shown in FIG. 4, the diaphragm operatively-associated rod 109 has been rotated to the open-aperture reference position (a mechanical rotation limit position) with the diaphragm operatively-associated rod 109 being in contact with the diaphragm control rod 19 while the diaphragm ring 117 has been fully rotated in a diaphragm opening direction against the biasing force of the diaphragm spring 121 so that the plurality of diaphragm blades 115 are held in a fully-open state. In addition, the slider 57 and the diaphragm control rod 19 have been further moved in a diaphragm stop-down direction by the diaphragm operatively-associated rod 109 having been rotated to the open-aperture reference position, thus prevented from rotating, and are held at an origin position corresponding to the open-aperture reference position of the diaphragm operatively-associated rod 109.

Thereafter, in a photographing operation, the slider 57 and the diaphragm control rod 19 are moved in the diaphragm stop-down direction by stepwise rotation of the stepping motor 53, and the diaphragm operatively-associated rod 109 moves in the diaphragm stop-down direction following the movement of the diaphragm control rod 19 until reaching a stop position that corresponds to a desired f-number. Thereupon, the stepping motor 53 is held at this stop position, and hence, the f-number corresponding to this stop position is set. The amount of stop-down of the diaphragm mechanism 119 (f-number) is controlled according to the number of steps (excitation pattern (NO.)) for driving the stepping motor 53 from the initial position thereof.

The holding force of an excitation holding state of the stepping motor 53 is stronger than the difference between the biasing force of the diaphragm spring 121 in the diaphragm stop-down direction, which acts on the diaphragm control rod 19, and the biasing force of the biasing spring 67 (of the slider 57) in the aperture-opening direction; hence, the slider 57 is held at a stopped position by the holding force of the excitation holding state of the stepping motor 53.

In this stopped-down state of the diaphragm apparatus 113, the diaphragm control mechanism 51 can drive the stepping motor 53 in either direction, i.e., the diaphragm stop-down direction or the diaphragm opening direction. Namely, diaphragm control during exposure is possible. Therefore, diaphragm control during a live-view operation or a movie shooting operation is possible.

The origin position detection sensor 63 (composed of the pair of magnets 64a and 64b and the Hall sensor 65) is configured to be capable of detecting, by movements of the diaphragm control rod 19 and the slider 57 in the diaphragm stop-down direction from the initial positions thereof, the initial position of the diaphragm operatively-associated rod 109 (which corresponds to the open-aperture reference position thereof) of the interchangeable lens 100 when mounted to the camera body 10. The origin position detection sensor 63 is configured and arranged to be capable of detecting the position of the slider 57 within a predetermined moving range thereof because the f-number at open aperture, i.e., the open-aperture reference position, of the diaphragm operatively-associated rod 109 varies depending on the type of photographing lens or varies due to assembling errors even in the same type of photographing lens as described above.

In the illustrated embodiment, when the slider 57 and the stepping motor 53 are stopped at the origin position corresponding to the open-aperture reference position of the diaphragm operatively-associated rod 109, the detection of the excitation pattern at the stopped position of the stepping motor 53 or the detection of the initial excitation pattern are referred to as the "origin-position initialization operation".

An origin-position initialization process for the diaphragm control mechanism 51 will be hereinafter discussed with reference to the timing charts shown in FIGS. 9 and 10 for the driving of the stepping motor 53, and with reference to the flow charts shown in FIGS. 11 through 14.

The stepping motor 53 in the present embodiment is a two-phase stepping motor which includes two-phase coils X and X– and coils Y and Y–, and rotates stepwise with four kinds of excitation patterns. Table 1 below shows the numbers (identification numbers) of these four kinds of excitation patterns (NO.) for the coils X, X–, Y and Y–. In this embodiment, by repeating the two-phase driving excitation patterns (0), (1), (2), (3) (i.e., by switching energization of the coils X, X–, Y and Y–), the stepping motor 53 can be driven stepwise in one direction (diaphragm stop-down direction). In addition, the stepping motor 53 can be driven stepwise in the other (opposite) direction (diaphragm opening direction) by repeating the excitation patterns (3), (2), (1), (0).

TABLE 1

| | NO. | | | |
|---|---|---|---|---|
| | (0) | (1) | (2) | (3) |
| X | 0 | 0 | 1 | 1 |
| X– | 1 | 1 | 0 | 0 |
| Y | 0 | 1 | 1 | 0 |
| Y– | 1 | 0 | 0 | 1 |

When the stepping motor 53 is excited with one of the four excitation patterns (NO.) and thereupon the excitation is cut off to hold the stepping motor 53, the first excitation (NO.) for the subsequent driving of the stepping motor 53 becomes one before or after the excitation pattern, in accordance with the driving direction of the stepping motor 53, at the time of the excitation cutoff. For instance, if the number of the excitation pattern (NO.) at the time of an excitation cutoff (at the time the stepping motor 53 is in a free state) is 0 (when the detent position is (0)), the subsequent excitation starts from the excitation pattern (1) in the case of driving the stepping motor 53 in the diaphragm stop-down direction, or starts from the excitation pattern (3) in the case of driving the stepping motor 53 in the diaphragm opening direction. Such an excitation operation is performed by the diaphragm control circuit 49 under the control of the CPU 45. In the present embodiment, the excitation patterns are switched at a constant pulse rate. Namely, the excitation patterns are switched from one excitation pattern to another after a continuation of energization (excitation) with each excitation pattern (NO.) for a fixed period of time t1 (several microseconds (ms)).

[Origin-Position Initialization Process]

In this embodiment, the stepping motor 53 is driven so that the slider 57 reciprocally moves a predetermined number of steps, and subsequently, the stepping motor 53 is brought into a free state upon the slider 57 returning to a position in the vicinity of the origin position thereof. Thereupon, the stop position of the stepping motor 53, after the stepping motor 53 has been rotated by the movement of the slider 57 and stopped, is detected to set this stop position as an origin position and to set the excitation pattern at this origin position as an initial excitation pattern. An outline description of such operations will be hereinafter discussed with reference to the timing charts shown in FIGS. 9 and 10.

At the commencement of the origin-position initialization operation, the position of the slider 57 is detected and stored (in a memory) as the origin position thereof before the stepping motor 53 is energized. Subsequently, the stepping motor 53 is energized in order, starting from the excitation pattern (0) as a reference start-up excitation pattern, to rotate in the diaphragm stop-down direction (direction to move the slider 57 away from the origin position against the biasing force of the biasing spring 67). Although the stepping motor 53 is energized with the excitation pattern (0) at the start, the stepping motor 53 does not rotate if previously at rest at the position of the excitation pattern (0), the stepping motor 53 attempts to rotate one step in the diaphragm opening direction if previously at rest at the position of the excitation pattern (1), the stepping motor 53 does not rotate or rotate in either the diaphragm stop-down direction or the diaphragm opening direction if previously at rest at the position of the excitation pattern (2), or the stepping motor 53 rotates in the diaphragm opening direction if previously at rest at the position of the excitation pattern (3). In any of these four cases, the stop position of the stepping motor 53 and the excitation pattern (NO.) coincide with each other at the third energization at the latest, so that the stepping motor 53 comes to rotate one step in the diaphragm stop-down direction from the fourth energization.

Figure 9:
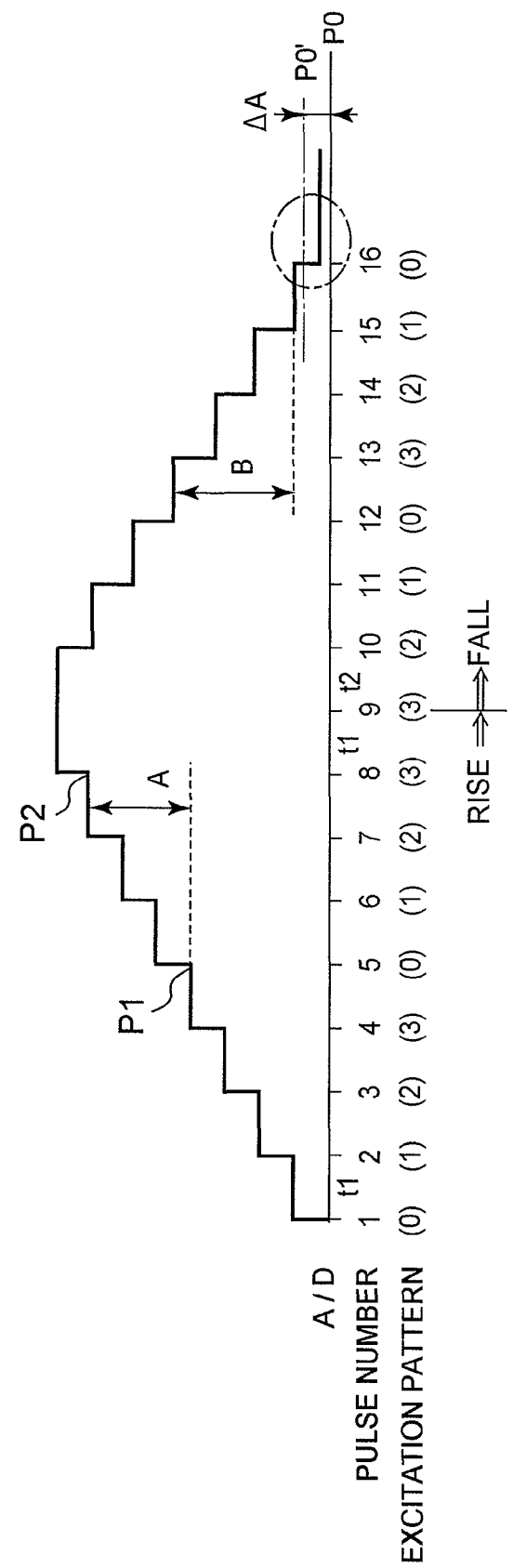
FIG. 9 is a timing chart showing the overall operation of the diaphragm control mechanism for the origin-position initialization process for the diaphragm control mechanism shown in FIGS. 11 through 14.

As shown in FIG. 9, the stepping motor 53 is driven a total of eight steps in the first half (forward stroke) of a reciprocating motion of the slider 57 in the present embodiment. In the course of this stepwise driving, the position of the slider 57 immediately before the excitation at the fifth step (during the excitation with the excitation pattern (3)) and the position of the slider 57 immediately before the excitation at the eighth step (during the excitation with the excitation pattern (2)) are detected to determine a moving distance A of the slider 57 when the slider 57 moves three steps. and further to determine the average of the moving, distance (stepwise moving distance per one step) of the slider 57 when the slider 57 moves one step (by dividing the moving distance A by three). Therefore, the value obtained by multiplying the average value by a predetermined coefficient less than 1 is set as $\Delta A$, and the value obtained by adding $\Delta A$ to an origin position value P0 is set as a threshold value P0'. Although the coefficient is set at 0.7 in this embodiment, it is desirable that the coefficient be in the range of 0.3 to 0.9. In the calculation of $\Delta A$, the reason why the position of the slider 57 commences to be detected from the position thereof immediately before the excitation at the fifth step (during the excitation with the excitation pattern (3)) is in order to precisely detect the position of the slider 57 in a state after the stepping motor 53 has been certainly rotated one step through a cycle of the four excitation patterns (0) through (4).

The first half of a reciprocating motion of the slider 57 is completed by excitation of eight steps, and subsequently the latter half (backward stroke) of the reciprocating motion of the slider 57 commences. In the latter half of the reciprocating motion of the slider 57, the CPU 45 drives the stepping motor 53 stepwise in the diaphragm opening direction while detecting the position of the slider 57. In this embodiment, since the stepping motor 53 is held with the excitation pattern (3) at the eighth step, the stepping motor 53 starts being driven stepwise in order from the excitation pattern (2) in the latter half of the reciprocating motion of the slider 57. Thereafter, every time the stepping motor 53 is driven one step, it is determined whether or not the detected position of the slider 57 has become less than the aforementioned threshold value P0' immediately before the stepping motor 53 is excited with the subsequent excitation pattern (NO.). The stepping motor 53 continues to be driven unless the detected position of the slider 57 has become less than the threshold value P0'.

Upon the detection position of the slider 57 becoming less than the threshold value P0', the excitation at this time continued (the excitation for the stepping motor 53 at this time is held) for a longer period of time than normal, and upon a lapse of this period of time, the excitation is stopped. The excitation pattern when the excitation is stopped is the excitation pattern of the origin position, and this excitation pattern is stored in memory as the initial excitation pattern. Thereafter, when the diaphragm is stopped down, excitation commences from the initial excitation pattern or the next excitation pattern thereof. Although the excitation may commence from the next excitation pattern after the initial excitation pattern, if excitation commences from the initial excitation pattern that was set at the start of the stop down operation, the slider 57 can be reliably moved from the origin position to a position less than the threshold value PO'. In this manner, according to the origin-position initialization operation in the present embodiment, the stepping motor 53 is stopped before mechanisms/components which are driven by the stepping motor 53 mechanically come into collision with each other, and accordingly, there is no possibility of such driven mechanisms/components being bent by the collision or undergoing any reaction from the collision. Moreover, by stopping the stepping motor 53 upon detecting that the position of the slider 57 has become less than the threshold value P0' and by finding the excitation pattern at this stopped position of the stepping motor 53, the excitation pattern, of the stepping motor 53, that should be excited in the subsequent actuation of the stepping motor 53 can be determined.

It is sometimes the case that the slider 57 does not stop instantaneously, thus slightly moving even after the excitation for the stepping motor 53 is stopped after being held as described above. Therefore, in the present embodiment, by detecting the position of the slider 57 and storing this position in memory immediately before the excitation is cut off and by again detecting the position of the slider 57 upon a lapse of a predetermined period of time from the cutoff of the excitation, a difference between the position of the slider 57 when it is held by the stepping motor 53 and the position of the slider 57 after it is released from being held by the stepping motor 53 (i.e., the position of the slider 57 when it stops after being moved to a mechanical moving limit by the biasing force of the biasing spring 67) is determined, and from this difference the excitation pattern (NO.) at the stop position of the stepping motor 53 is determined and stored in memory as the initial excitation pattern (NO.). In FIGS. 9 and 10, the initial excitation pattern (NO.) is (0). In the above described embodiment, although the threshold value P0' ($\Delta A$) is set based on detection results (of the position of the slider 57) when the slider 57 is positioned far away from the origin position in the forward stroke of the reciprocating motion of the slider 57, the detection of the amount of movement of the slider 57 can be carried out with higher precision if detected near the origin position by which the Hall sensor 65 and the pair of magnets 64 are positioned close to each other. Hence, in an alternative embodiment, the threshold value P0' is set based on detection results (of the position of the slider 57) when the slider 57 is positioned 4 through 1 steps from the origin position during the backward stroke of the reciprocating motion of the slider 57 to determine a distance B of the slider 57 when the slider 57 moves three steps. Accordingly, a value B/3 of the moving distance (stepwise moving distance per one step) of the slider 57 that is multiplied by the above-mentioned coefficient in the range of 0.3 to 0.9, preferably 0.7, can be substituted for $\Delta A$ when setting the threshold value P0'.

Furthermore, in another embodiment, the value B/3 of the moving distance (stepwise moving distance per one step) of the slider 57 is set to $\Delta B$, and the following processes are performed.

Figure 10:
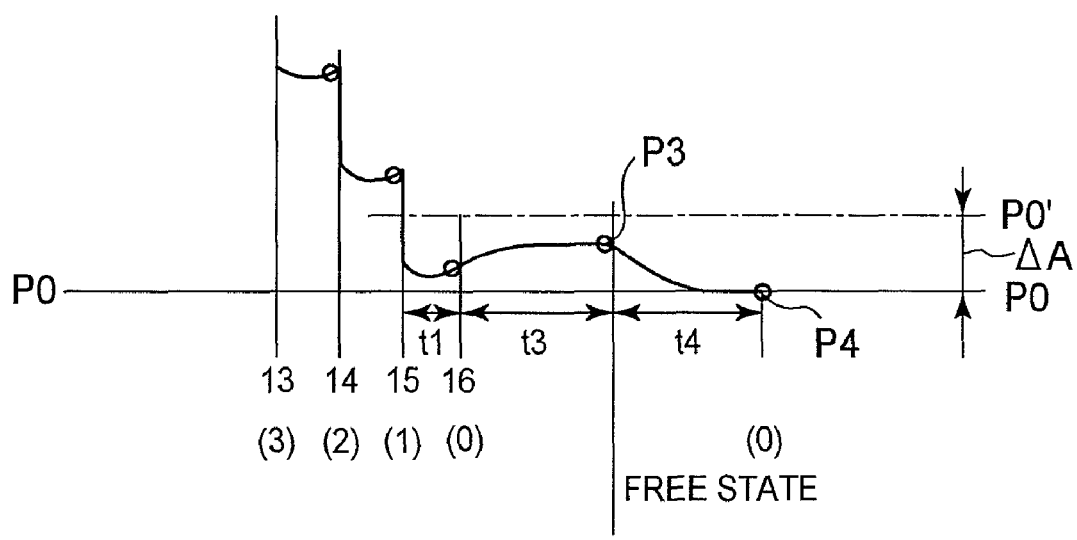
FIG. 10 is a timing chart showing operations in the origin-position initialization process which are performed from the moment that the slider returns to a position in the close vicinity of the origin position thereof.

In FIGS. 9 and 10, the detection position of the slider 57 becomes less than the threshold value P0' when the stepping motor 53 is excited with the excitation pattern (0) at the sixteenth pulse. From this state, the stepping motor 53 is held for a predetermined period of time t3 and, immediately before this holding is released, the position of the slider 57 (see P3 shown in FIG. 10) is detected and stored in memory. Subsequently, the position of the slider 57 (see P4 shown in FIG. 10) is again detected and stored in memory upon a lapse of a predetermined period of time t4 from the moment at which the holding of the stepping motor 53 is released. The difference between the positions P3 and P4 of the slider 57 is greater than a half of the value B/3 of the moving distance (stepwise moving distance per one step) of the slider 57 and less than B/3 multiplied by 1.5 (B/3×1.5); and accordingly, the excitation pattern subsequent to the excitation pattern at the time the detection position of the slider 57 becomes less than the threshold value P0' is determined to be the initial excitation pattern (NO.). Namely, in this particular case the initial excitation pattern is the excitation pattern (3) that follows the excitation pattern (0) of the free state.

Thereafter, when a photographing operation is performed, namely, when the diaphragm apparatus 113 of the interchangeable lens 100 is driven to operate the diaphragm stop-down operation thereof, the stepping motor 53 is excited (energized) starting from the initial excitation pattern (3), and thereafter switches to the excitation pattern (0), the excitation pattern (1), the excitation pattern (2), etc. Although the excitation operation should originally start from the subsequent excitation pattern (0), the reason why the excitation operation starts from the initial excitation pattern (3) is to return the stepping motor 53 to the position of the excitation pattern (3) regardless of the stop position of the stepping motor 53 because the stepping motor 53 is sometimes at rest at a position beyond the position of the initial excitation pattern (3) toward the position of the excitation pattern (0). The excitation pattern at the moment the detection position of the slider 57 becomes less than the threshold value P0' simply becomes the initial excitation pattern in the case where the difference between the positions P3 and P4 of the slider 57 is less than a half of the ΔB.

Accordingly, by stopping the stepping motor 53 upon the detection position of the slider 57 becoming less than the threshold value P0' and by finding the excitation pattern at this stopped position of the stepping motor 53, the excitation pattern, of the stepping motor 53, that should be excited in the subsequent actuation of the stepping motor 53 can be determined.

In this manner, according to the present embodiment, the stepping motor 53 is stopped not only before the slider 57 stops by a mechanical collision but also at a position less than one step to the origin position. Therefore, since the slider 57 returns to a mechanical collision position thereof, where the slider 57 stops by a mechanical collision, while driving the lead screw 55, the stepping motor 53 and the diaphragm apparatus 113 of the interchangeable lens 100 by the biasing force of the biasing spring 67 by a distance less than one step of the stepping motor 53, the initial excitation pattern (NO.) of the stepping motor 53 can be obtained with precision.

The origin-position initialization process will be hereinafter discussed in detail with reference further to the flow charts shown in FIGS. 11A through 14. The origin-position initialization process is controlled by the CPU 45 of the camera body 10. Control enters the origin-position initialization process upon the power being turned ON by switching ON the power switch 23 of the camera body 10. Upon completion of the origin-position initialization process, control enters a normal photography process. In the following description, it is assumed that the interchangeable lens 100 is already attached on the camera body 10.

Upon control entering the origin-position initialization process, various initial setting operations are performed at steps S101 and S103. At step S101, an INIT termination flag is reset (=0) and variables are initialized; thereafter the voltage of the Hall sensor 65 which is detected before the stepping motor 53 is excited is detected and A/D converted, and the digital value (A/D value) thus obtained is stored in memory as an origin-position detection value (detection position) P0. At step S103, the initial excitation pattern (NO.) is set to (0) and a remaining drive step number is set to 8. The origin position value P0 represents the current stop position of the slider 57 and is utilized as the origin position of the slider 57. The remaining drive step number represents the number of the remaining steps for driving the stepping motor 53 in the diaphragm stop-down direction in the forward stroke in the origin-position initialization process; in this embodiment the stepping motor 53 is driven eight steps. After completion of the above described initial setting operations, a forward-stroke loop process at steps S105 through S127 is performed.

First, it is determined whether or not the remaining drive step number is 0 (step S105). Since the remaining drive step number is not 0 (NO at step S105) when control first enters the operation at step S105, it is determined whether or not the remaining drive step number is 4 (step S107). The remaining drive step number 4 corresponds to one of the two reference positions at which the moving distance of the slider 57 by three steps is detected. Since the remaining drive step number is not 4 when control first enters the operation (NO at step S107), control skips the operation at step S109 and proceeds to step S111.

At step S111 it is determined whether or not the remaining drive step number is 1. The remaining drive step number 1 corresponds to the other of the two reference positions at which the moving distance of the slider 57 by three steps is detected. Since the remaining drive step number is not 1 when control first enters the operation at step S111 (NO at step S111), control skips the operation at step S113 and proceeds to step S115.

At step S115, a former excitation pattern (NO.) is set to the current excitation pattern (NO.). The former excitation pattern (NO.) is a variable for the previous excitation pattern (NO.). The current excitation pattern (NO.) is a variable for the excitation pattern (NO.) with which the stepping motor 53 is about to be excited or currently excited. Since the current excitation pattern (NO.) is (0) when control first enters the operation at step S115, the former excitation pattern (NO.) is set to (0). Subsequently, the stepping motor 53 is excited with the current excitation pattern (NO.) (step S117). Although the stepping motor 53 is excited with the current excitation pattern (0) for the first time, the stepping motor 53 does not rotate if at rest at the position of the excitation pattern (0), the stepping motor 53 rotates one step in the diaphragm stop-down direction if at rest at the position of the excitation pattern (3), the stepping motor 53 attempts to (but cannot) rotate one step in the diaphragm opening direction if at rest at the position of the excitation pattern (1), or the rotational direction of the stepping motor 53 is undefined if at rest at the position of the excitation pattern (2). Subsequently, it is determined whether or not the current excitation pattern is (3) (step S119). If the current excitation pattern is not (3) (NO at step S119), the current excitation pattern (NO.) is incremented by 1 (step S121), whereas the excitation pattern (NO.) is set to (0) (step S123) if the current excitation pattern (NO.) is (3) (if YES at step S119). Since the current excitation pattern (NO.)

is a recurring number from (0) to (3), the operation at step S123 is for resetting the excitation pattern (3) to (0) if the current excitation pattern (NO.) is (3). Since the current excitation pattern (NO.) is (0) when control first enters the operation at step S121, the current excitation pattern (NO.) is incremented by 1 to become (1).

Subsequently, the remaining drive step number is decremented by 1 (step S125) and control waits for a fixed period of time t1 (ms) (step S127). Upon a lapse of this fixed period of time t1, control returns to step S105. This process for waiting this fixed period of time t1 constitutes the duration time for holding the energization (excitation) at each excitation pattern (NO.).

The operations at steps S105 through S127 are repeated until it is determined at step S105 that the remaining drive pulse number is 0. In the forward-stroke loop process, if it is determined at step S107 that the remaining drive pulse number is 4 (if YES at step S107), the detection value of the Hall sensor 65 is A/D converted and stored in memory as a detection value P1 (step S109). Additionally, if it is determined at step S111 that the remaining drive pulse number is 1 (if YES at step S111), the detection value of the Hall sensor 65 is A/D converted and stored in memory as a detection value P2 (step S113).

Figure 11B:
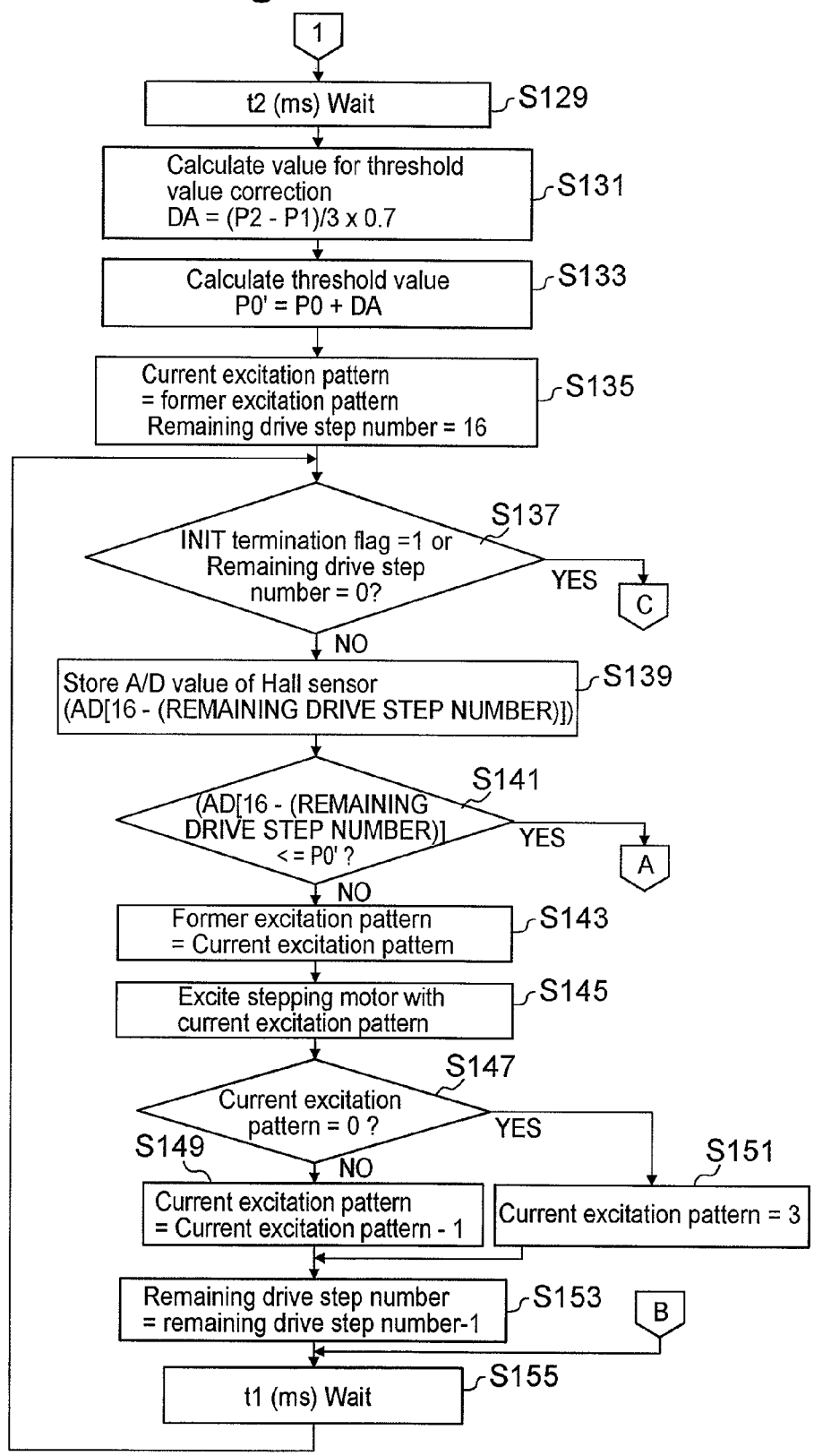
Figure 12:
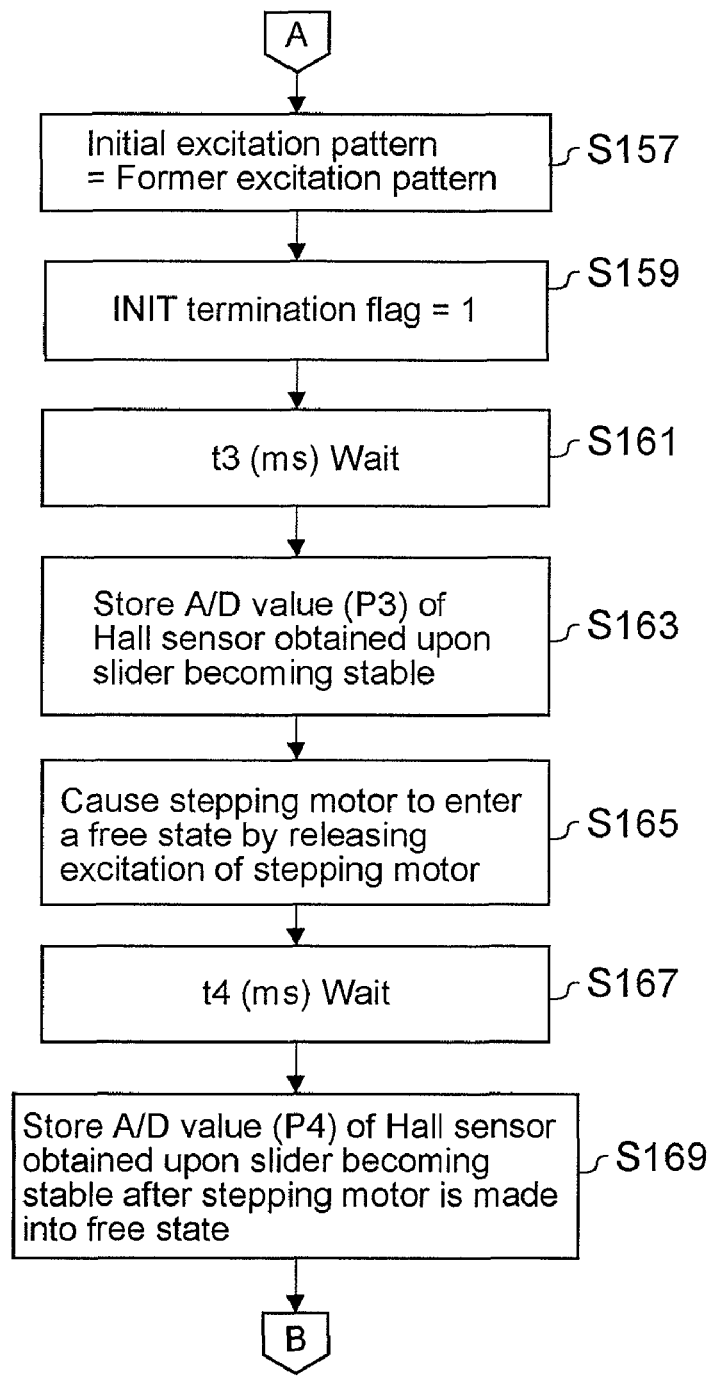
FIG. 12 is a flow chart showing operations of the origin-position initialization process for the diaphragm control mechanism.
Figure 13A:
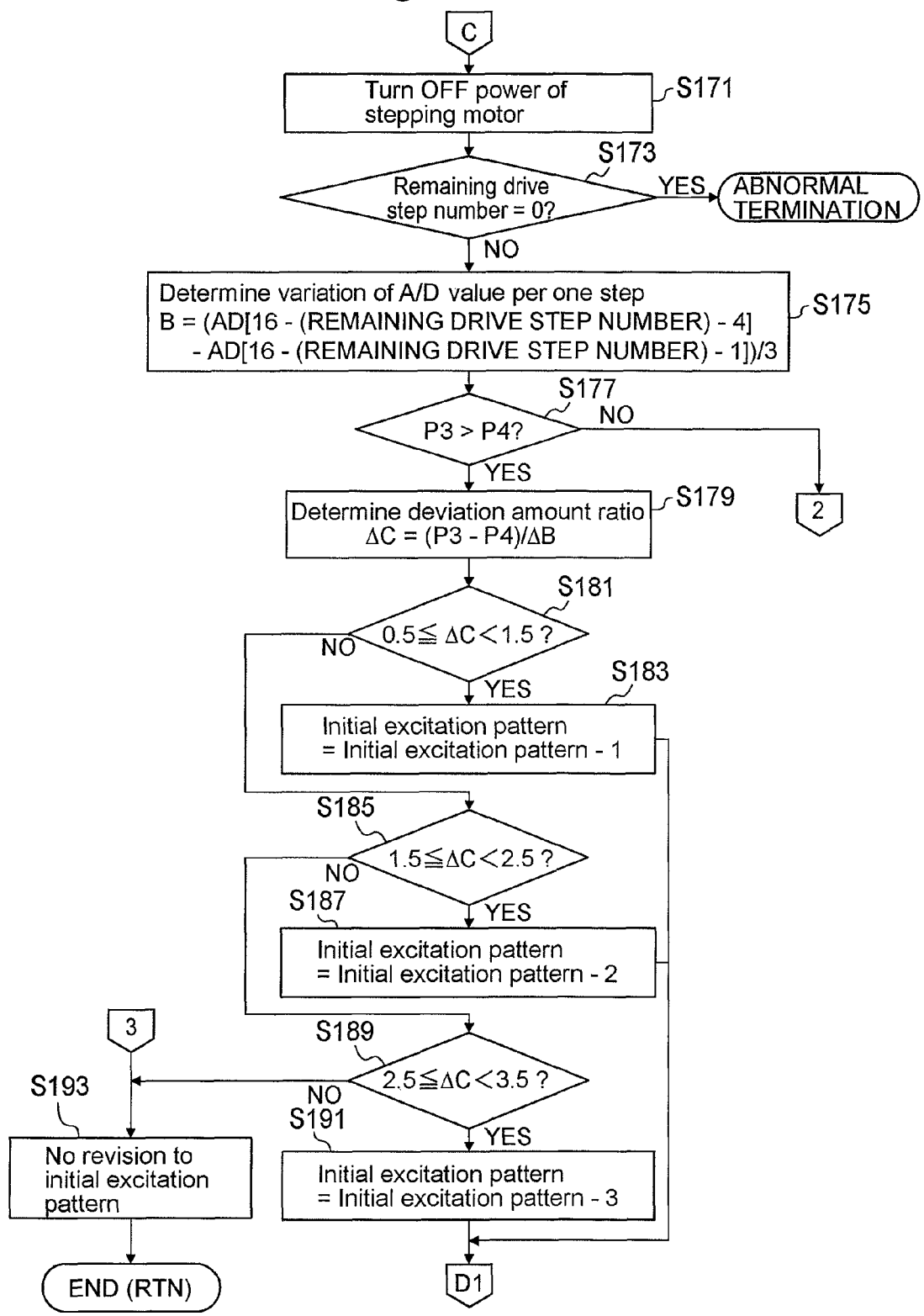
FIGS. 13A and 13B show a flow chart showing operations of the origin-position initialization process for the diaphragm control mechanism.
Figure 13B:
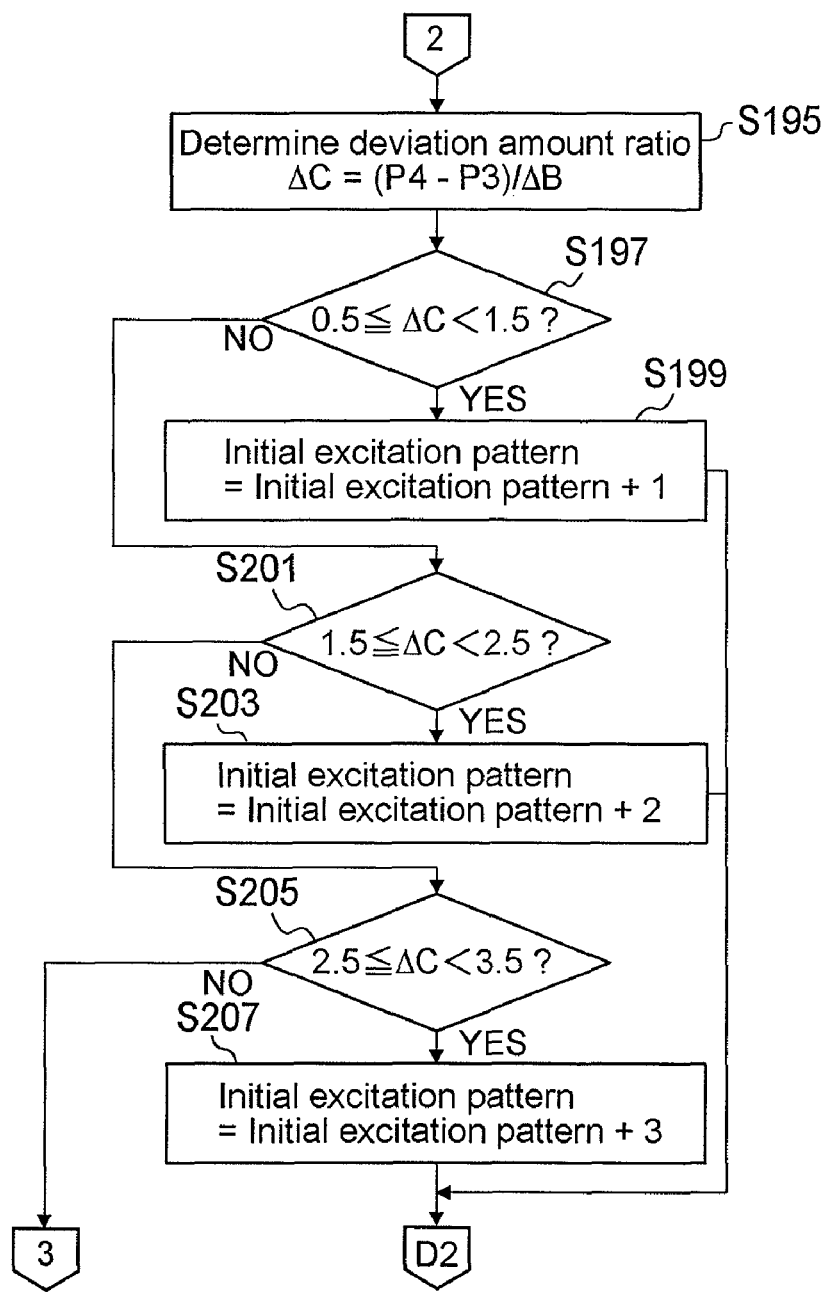
Figure 14:
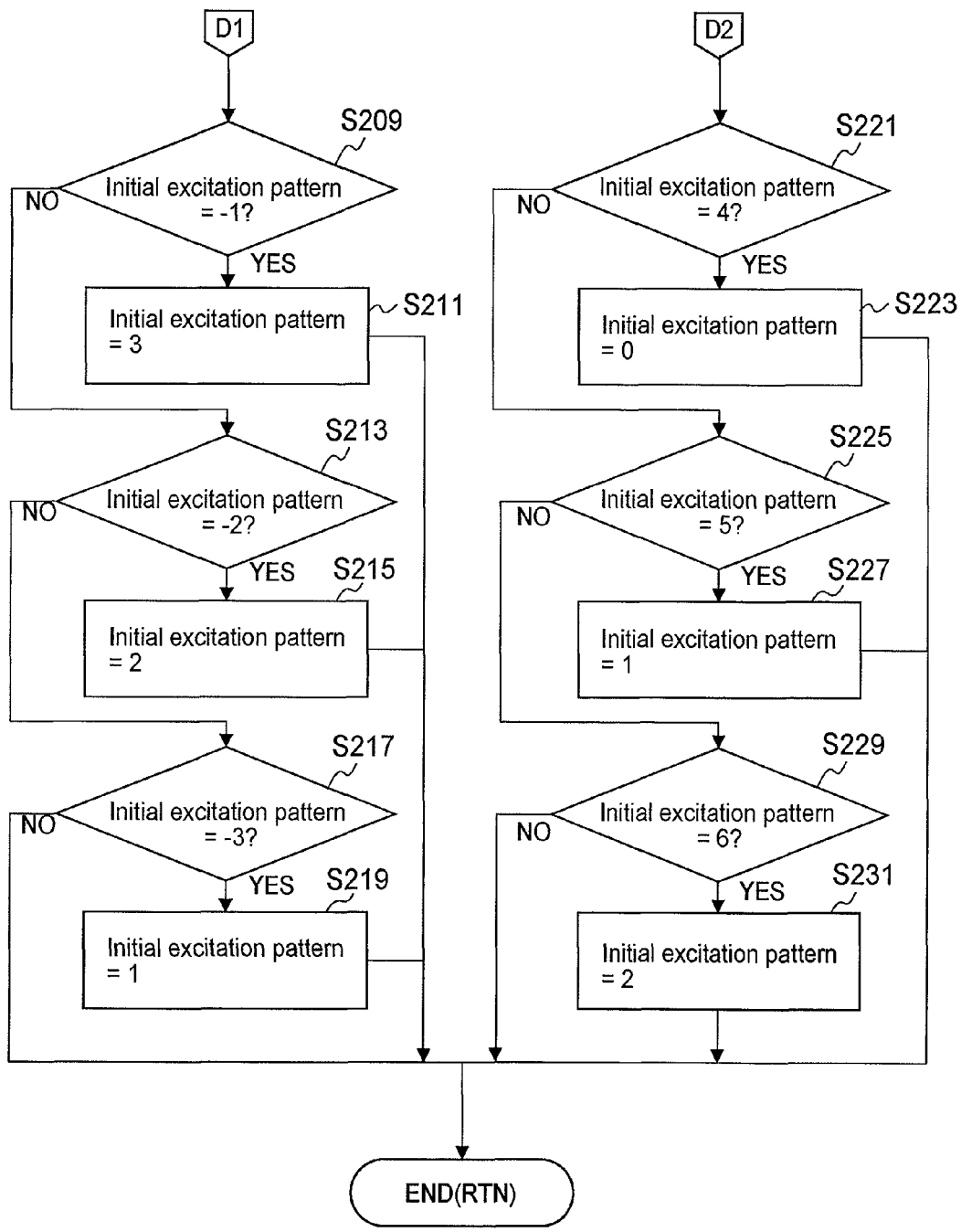
FIG. 14 is a flow chart showing operations of the origin-position initialization process for the diaphragm control mechanism.

Upon the remaining drive pulse number becoming 0 (if YES at step S105), control proceeds to step S129 (see FIG. 11B). The process from step S129 onwards is a backward-stroke loop process in which the stepping motor 53 is driven in the diaphragm opening direction (toward the origin position) to return the slider 57 to the origin position. The reason why the moving distance (moving amount) of the slider 57 per one step is determined from the detection value P1 of the Hall sensor 65 obtained at the time the remaining drive step number is 4 at steps S107 and S109, and the reason why the detection value P2 of the Hall sensor 65 obtained at the time the remaining drive step number is 1 at steps S111 and S113 (i.e., at the time the stepping motor 53 is driven three steps), is to determine the moving distance of the slider 57 per one step with higher precision by detecting the position of the slider 57 after the stepping motor 53 is driven by one secure step by switching the excitation pattern upon the excitation pattern has been switched by full cycle (i.e., the excitation pattern has been switched (0)→(1)→(2)→(3)→(0) in that order) from the commencement of driving of the stepping motor 53.

At step S129 control waits a predetermined period of time t2 (ms). By holding the stepping motor 53 for a period of time t1+t2 (ms) in this manner, vibrations, etc., of moving parts such as the stepping motor 53 and the slider 57 are attenuated during this holding period.

Subsequently, the value ΔA for threshold value correction is calculated (step S131).

$$\Delta A = (P2-P1)/3 \times 0.7$$

wherein "(P2−P1)" represents the distance (A) by which the slider 57 has moved while the stepping motor 53 rotates three steps from the remaining drive step number 4 to the remaining drive step number 1 during the forward stroke in the origin-position initialization process, and "0.7" is a correction factor.

Subsequently, the threshold value P0' is calculated (step S133).

$$P0' = P0 + \Delta A$$

wherein "ΔA" corresponds to the distance (length) from the origin position value P0.

Thereafter, the current excitation pattern (NO.) is set to the former excitation pattern (NO.) and the remaining drive step number is set to 16 (step S135). The former excitation pattern (NO.) is the excitation pattern (NO.) which is set immediately before control enters the operation at step S129 from the operation at step S105 and which is currently excited before the current excitation pattern (NO.) is incremented by 1 following the completion of the excitation operation. In the present embodiment, the excitation pattern (NO.) which is currently excited is the excitation pattern (3), so that the current excitation pattern (NO.) is set to (3). The remaining drive step number in the backward-stroke loop process is set to be greater than that in the forward-stroke loop process in order to reliably return the slider 57 to the origin position.

Subsequently, it is determined whether the current INIT termination flag is 1 or the remaining drive step number is 0 (step S137). The INIT termination flag is a flag for terminating the origin-position initialization process; the origin-position initialization process is terminated if the INIT termination flag is "1" and not terminated if the INIT termination flag is "0". In addition, in the initialization process at step S101, the INIT termination flag is cleared (set to 0). If the current INIT termination flag is not 1 or the remaining drive step number is not 0 (if NO at step S137), a positional signal detected by the Hall sensor 65 is A/D converted and stored as a detection position (AD[16−REMAINING DRIVE STEP NUMBER]) (step S139). Subsequently, it is determined whether or not the detection position (AD[16−REMAINING DRIVE STEP NUMBER]) is equal to or less than the threshold value P0' (step S141). If the A/D converted detection position (AD[16−REMAINING DRIVE STEP NUMBER]) is not equal to or less than P0' (NO at step S141), the former excitation pattern (NO.) is set to the current excitation pattern (NO.) (step S143) and the stepping motor 53 is excited with the current excitation pattern (NO.) (step S145). The detection position (AD[16−REMAINING DRIVE STEP NUMBER]) represents the number of steps that the stepping motor 53 has been driven in the backward-stroke loop process.

Subsequently, it is determined whether or not the current excitation patter (NO.) is (0) (step S147). If the current excitation patter (NO.) is not (0) (if NO at step S147), the current excitation pattern (NO.) is decremented by 1 (step S149). If the current excitation patter (NO.) is (0) (if YES at step S147), the current excitation pattern (NO.) is set to (3) (step S151). The reason why the current excitation pattern (NO.) is set to (3) when the current excitation pattern (NO.) is (0) is to change the excitation pattern (NO.) back to (3) after the excitation pattern (NO.) becomes (0) since the excitation pattern (NO.) recurs in the order of (3), (2), (1), (0). Subsequently, the remaining drive step number is decremented by 1 (step S153) and control waits the fixed period of time t1 (ms) (step S155). Upon a lapse of this fixed period of time t1, control returns to step S137.

By repeating the above described operations at steps S137 through S155, the CPU 45 can control the stopping motor 53 to drive the stepping motor 53 stepwise in the diaphragm opening direction while detecting the position of the slider 57 via the Hall sensor 65. In the loop process at steps S137 through S155, control waits for the current INIT termination flag to be set to 1 or the remaining drive step number to become 0 (YES at step S137), or waits for the A/D converted detection position (AD[16−REMAINING DRIVE STEP NUMBER]) to become equal to or less than P0' (YES at step S141). Normally, the current position (AD[16−REMAINING DRIVE STEP NUMBER]) first becomes equal to or less than P0' (YES at step S141). This indicates that the slider 57 has returned to the position between the origin position value P0 and the threshold value P0'.

If it is determined at step S141 that the A/D converted detection position (AD[16−REMAINING DRIVE STEP NUMBER]) is equal to or less than P0' (YES at step S141), the initial excitation pattern (NO.) is set to the former excitation pattern (NO.) (step S157), the INIT termination flag is set to 1 (step S159), and control waits a first waiting time t3 (ms) that is longer than the fixed period of time t1 (step S161). Namely, upon the detection position becoming equal to or less than P0', the excitation of the stepping motor 53 is held for the first waiting time t3 so as to be forced to stop. This forcible stop by such an excitation holding attenuates vibrations, etc., of each element/component of the diaphragm control mechanism such as the stepping motor 53 and the slider 57 of the camera body 10 and the diaphragm apparatus 113 of the interchangeable lens 100.

After the slider 57 becomes stable, an energized-stop detection value P3 that is obtained by A/D converting a detected output of the Hall sensor 65 is stored in memory (step S163).

Thereafter, the excitation of the stepping motor 53 is released (energization thereof is cut off) to cause the stepping motor 53 to enter a free state (step S165), and control waits a second waiting time t4 (ms) (step S167). Upon the slider 57 stably stopping upon the stepping motor 53 coming to a free state in this manner, a value obtained by A/D converting a detected output of the Hall sensor 65 is stored in memory as a free-stop detection value P4 (step S169), and control returns to step S155. Control waits a second waiting time t4 (ms) at step S167 in order to detect the stop position of the slider 57 when the diaphragm apparatus 113 has returned to the mechanical initial state thereof because, if the stepping motor 53 is made to enter a free state, it is sometimes the case that the slider 57 moves to the stop position at which the diaphragm apparatus 113 comes into a mechanical initial state while rotating the stepping motor 53 by the biasing force of the biasing spring 67. Although the first waiting time t3 and the second waiting time t4 are set identical to each other, each of these waiting times is altered as required.

Upon control returning to step S155 from step S169, control waits the fixed period of time t1 (ms)) and thereupon it is determined whether the current INIT termination flag is 1 or the remaining drive step number is 0 (step S137). At this time the current INIT termination flag has been set to 1 (YES at step S137), so that control proceeds to step S171 at which the power (excitation) of the stepping motor 53 is turned OFF. Thereafter it is determined whether or not the remaining drive step number is 0 (step S173). If the remaining drive step number is 0 (if YES at step S173), control proceeds to an abnormal termination process; this is because it is conceivable that some type of malfunction might have occurred if the stepping motor 53 does not return to the origin position by being driven at the set drive step number because the number of drive steps for the stepping motor 53 in the backward-stroke loop process is set to be greater than that in the forward-stroke loop process. Although not shown in the drawings, the abnormal termination process is such a process as to indicate a visual sign or indication showing an abnormal state on the display 43.

If the remaining drive step number is not 0 (if NO at step S173), a variation (amount of variation) ΔB of the detection value per one step is determined (step S175). The variation ΔB is determined by the following equation:

$$\Delta B' = (AD[16-\text{REMAINING DRIVE STEP NUMBER}-4] - AD[16-\text{REMAINING DRIVE STEP NUMBER}-1])/3 \times 0.9.$$

The reason why the variation (amount of variation) ΔB of the detection value per one step is multiplied by 0.9 to attain a smaller value thereof is because if the amount of movement of one step were to be used as the variation, a subsequent control process would detect a movement amount exceeding one step.

Subsequently, it is determined whether or not the energized-stop detection value P3 is greater than the free-stop detection value P4 (step S177). Namely, it is determined whether the slider 57 has moved in the diaphragm opening direction (YES at step S177), or has not moved in the diaphragm opening direction or moved in the diaphragm stop-down direction (NO at step S177) upon the stepping motor 53 entering a free state.

[When Moved in Diaphragm Opening Direction]

If the energized-stop detection value P3 is greater than the free-stop detection value P4 (if YES at step S177), a deviation amount ratio ΔC from the energized-stop detection value P3 is determined at step S179 by the following equation:

$$\Delta C = (P3-P4)/\Delta B.$$

If the deviation amount ratio ΔC is 1, this means that the stepping motor 53 has rotated one step; if the deviation amount ratio ΔC exceeds 1, this means that the stepping motor 53 has rotated more than one step. In regard to the rotational step of less than one step of stepping motor 53, the initial excitation pattern is corrected when ΔC is 0.5 (half of one rotational step) or more.

Thereafter, it is determined whether or not the deviation amount ratio ΔC is equal to or greater than 0.5 and less than 1.5 (step S181). At step S185 it is determined whether or not the deviation amount ratio ΔC is equal to or greater than 1.5 and less than 2.5. At step S189 it is determined whether or not the deviation amount ratio ΔC is equal to or greater than 2.5 and less than 3.5.

If it is determined that the deviation amount ratio ΔC is equal to or greater than 0.5 and less than 1.5 (if YES at step S181), the initial excitation pattern (NO.) is decremented by 1 (step S183) and control proceeds to step S209.

If it is determined that the deviation amount ratio ΔC is equal to or greater than 1.5 and less than 2.5 (if YES at step S185), the initial excitation pattern (NO.) is decremented by 2 (step S187) and control proceeds to step S209.

If it is determined that the deviation amount ratio ΔC is equal to or greater than 2.5 and less than 3.5 (if YES at step S189), the initial excitation pattern (NO.) is decremented by 3 (step S191) and control proceeds to step S209.

If the deviation amount ratio ΔC does not satisfy any of the above three conditional expressions at steps S181, S185 and S189 (if NO at each step S181, S185 and S189), i.e., if the deviation amount ratio ΔC is less than 0.5, no revision is made to the initial excitation pattern (NO.) (step S193) and control ends the origin-position initialization process.

Operations at steps S209 through S219 serve as a process of returning the initial excitation pattern (NO.) from which 1, 2 or 3 has been subtracted at step S183, S187 or S191 to (3), (2), or (1), respectively.

If it is determined that the initial excitation pattern (NO.) is −1 (if YES at step S209), the initial excitation pattern (NO.) is set to (3) (step S211) and control ends the origin-position initialization process.

If it is determined that the initial excitation pattern (NO.) is −2 (if YES at step S213), the initial excitation pattern (NO.) is set to (2) (step S215) and control ends the origin-position initialization process.

If it is determined that the initial excitation pattern (NO.) is −3 (if YES at step S217), the initial excitation pattern (NO.) is set to (1) (step S219) and control ends the origin-position initialization process.

If it is determined that the initial excitation pattern (NO.) is not any of −1, −2 and −3, i.e., if the initial excitation pattern (NO.) is (0), (1) or (2) (if NO at each step S209, S213 and S217), control simply ends the origin-position initialization process.

[Diaphragm Stop-Down Direction]

If the energized-stop detection value P3 is not greater than the free-stop detection value P4 (if NO at step S177), the slider 57 is in the process of further moving in the diaphragm opening direction from the energized-stop detection value P3, and accordingly, a deviation amount ratio ΔC from the free-stop detection value P4 is determined at step S195 by the following equation:

$$\Delta C = (P4-P3)/\Delta B.$$

Subsequently, it is determined whether or not the deviation amount ratio ΔC is equal to or greater than 0.5 and less than 1.5 (step S197). At step S201 it is determined whether or not the deviation amount ratio ΔC is equal to or greater than 1.5 and less than 2.5. At step S205 it is determined whether or not the deviation amount ratio ΔC is equal to or greater than 2.5 and less than 3.5.

If it is determined that the deviation amount ratio ΔC is equal to or greater than 0.5 and less than 1.5 (if YES at step S197), the initial excitation pattern (NO.) is incremented by 1 (step S199) and control proceeds to step S221.

If it is determined that the deviation amount ratio ΔC is equal to or greater than 1.5 and less than 2.5 (if YES at step S201), the initial excitation pattern (NO.) is decremented by 2 (step S203) and control proceeds to step S221.

If it is determined that the deviation amount ratio ΔC is equal to or greater than 2.5 and less than 3.5 (if YES at step S205), the initial excitation pattern (NO.) is decremented by 3 (step S207) and control proceeds to step S221.

If the deviation amount ratio ΔC does not satisfy any of the above three conditional expressions at steps S197, S201 and S205 (if NO at each step S197, S201 and S205), i.e., if the deviation amount ratio ΔC is less than 0.5, no revision is made to the initial excitation pattern (NO.) (step S193) and control ends the origin-position initialization process. In this manner, in the case where the absolute value of the deviation amount ratio ΔC is less than 0.5 (½), no revision is made to the initial excitation pattern (NO.).

Operations at steps S221 through S231 serve as a process of returning the initial excitation pattern (NO.) to which 1, 2 or 3 has been added at step S199, S203 or S207 to (0), (1), or (2).

If it is determined that the initial excitation pattern (NO.) is 4 (if YES at step S221), the initial excitation pattern (NO.) is set to (0) (step S223) and control ends the origin-position initialization process.

If it is determined that the initial excitation pattern (NO.) is 5 (if YES at step S225), the initial excitation pattern (NO.) is set to (1) (step S227) and control ends the origin-position initialization process.

If it is determined that the initial excitation pattern (NO.) is 6 (if YES at step S229), the initial excitation pattern (NO.) is set to (2) (step S231) and control ends the origin-position initialization process.

If it is determined that the initial excitation pattern (NO.) is not any of 4, 5 and 6, i.e., if the initial excitation pattern (NO.) is (1), (2) or (3) (if NO at each step S221, S225 and S229), control simply ends the origin-position initialization process.

According to the above described origin-position initialization process, when the stepping motor 53 is driven to return to the initial stop position after being driven eight steps in the diaphragm stop-down direction, the driving of the stepping motor 53 is stopped upon the stepping motor 53 returning to either the initial stop position or a position corresponding to a moving distance of the slider 57 which is less than a distance corresponding to one step. Therefore, no mechanical collision occurs in the diaphragm control mechanism 51 and the stepping motor 53 is not forced to rotate in the diaphragm stop-down direction by bending or repulsion, etc., which makes it possible to precisely detect the stop position of the stepping motor 53.

Moreover, even if the slider 57 is forced to move by a resilient biaser such as the biasing spring 67 after the stepping motor 53 is stopped, the initial excitation pattern (NO.) is corrected based on the difference between the distance between the position at which the stepping motor 53 is forced to stop and the position at which the stepping motor 53 naturally stops, and the determined moving distance per one step, so that the initial excitation pattern (NO.) of the stepping motor 53 can be properly set with precision.

Although it is possible that the variation ΔB of the aforementioned detection value per one step be substituted for the aforementioned value ΔA to simplify the origin-position initialization process, the variation ΔB is not substituted by the value ΔA in this embodiment, and the variation ΔB is calculated based on the detection value detected under the condition that the output characteristic of the Hall sensor 65 becomes linear with an optimum detection accuracy at the position where the remaining drive step number is 4, i.e., in the vicinity of the origin position. Accordingly, the variation ΔB can be calculated with precision and the excitation pattern can be grasped with precision. In addition, the number of steps for determining the moving distance can be two, four or more than four.

The initial excitation pattern (0) of the stepping motor 53 that is set by the above described origin-position initialization process is stored in an internal memory (e.g., EEPROM) and used at a time of exposure. In addition, when the subsequent origin-position initialization process is performed, it is desirable that the initial excitation pattern (0) thus stored in the internal memory be read out upon the power being turned ON or OFF to be used as the initial excitation pattern (NO.) in the origin-position initialization process.

It is possible that the moving distance per one step be a predetermined value which is stored in memory beforehand and read out and used when the origin-position initialization process is performed.

In addition, although the stepping motor 53 is driven a preset number of steps in the forward-stroke loop process in the present embodiment of the origin-position initialization process, it is possible that such a step number be not set in advance; for instance, it is possible to detect the position of the slider 57 while driving the stepping motor 53 with predetermined excitation patterns and to terminate the forward-stroke loop process to proceed to the backward-stroke loop process upon the moving distance per one unit becoming equal to a predetermined distance a plurality of times in a row.

Figure 15:
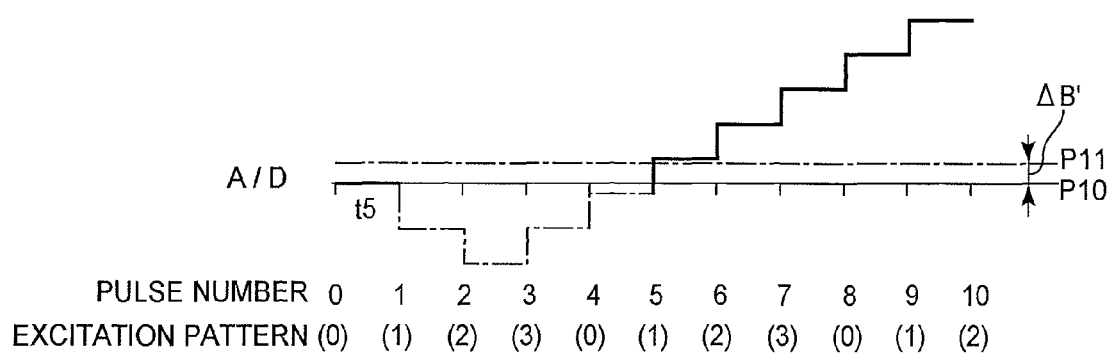
FIG. 15 is a timing chart of the diaphragm stop-down process of the diaphragm control mechanism.
Figure 16A:
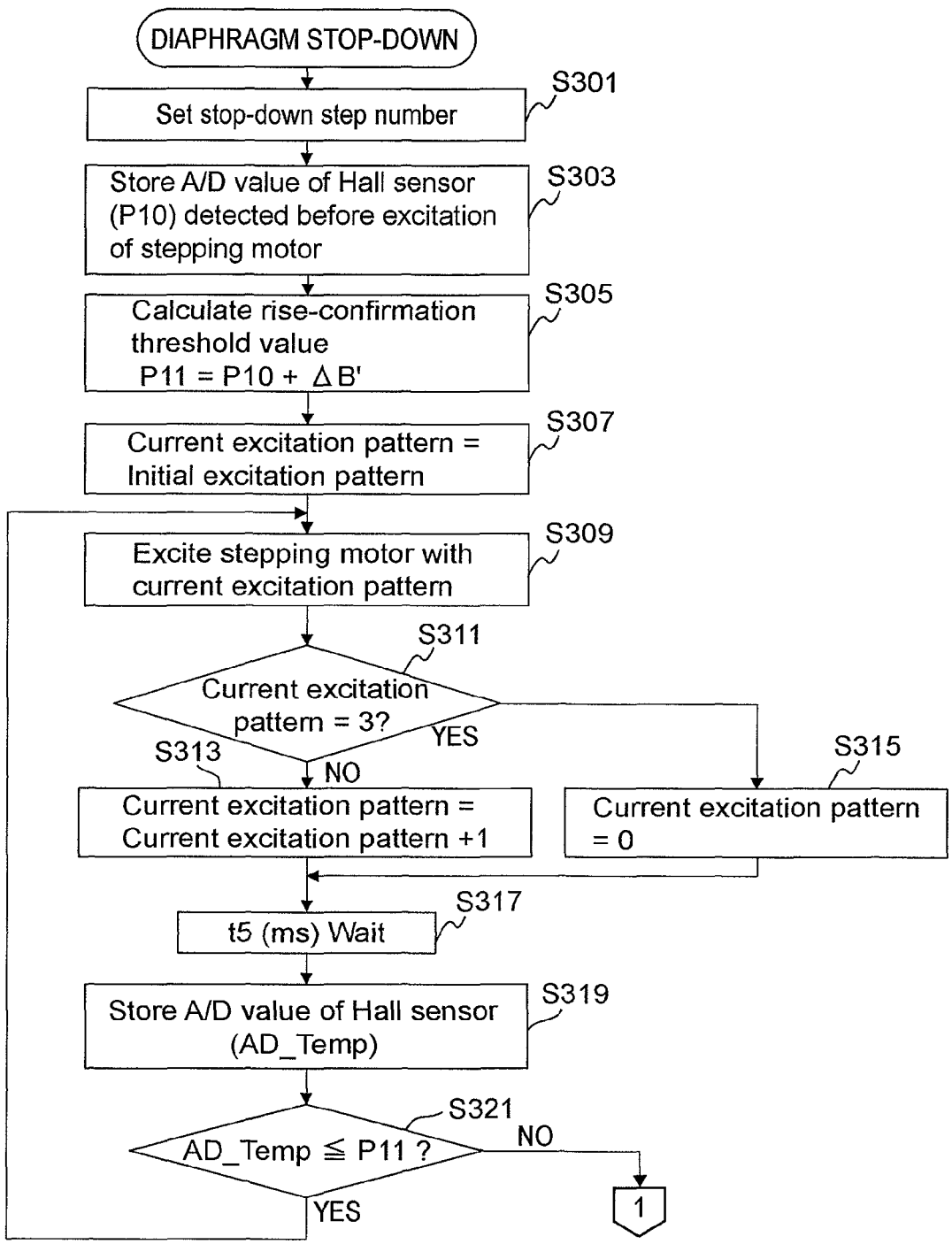
FIGS. 16A and 16B shows a flow chart showing the diaphragm stop-down process of the diaphragm control mechanism.
Figure 16B:
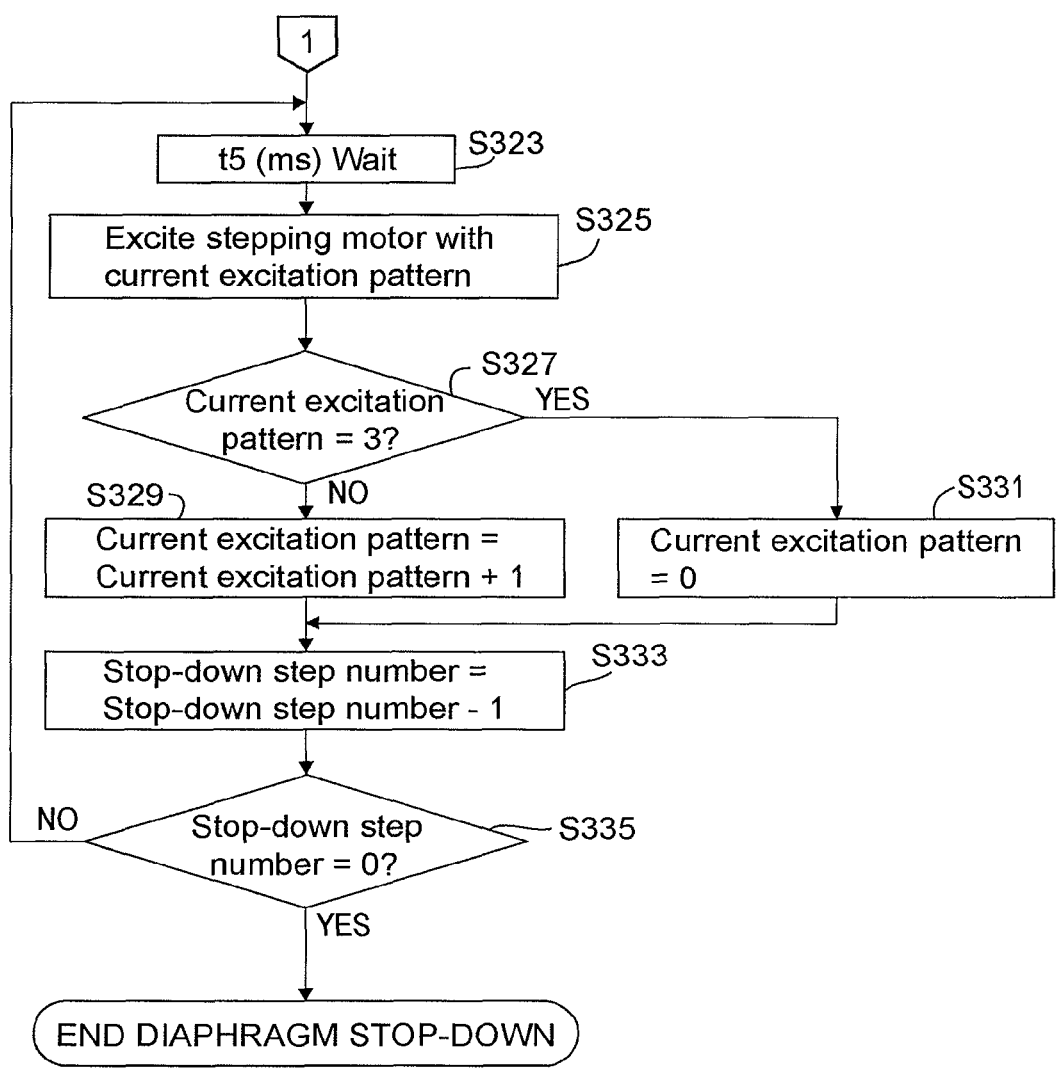

In actual use, even if the initial excitation pattern (NO.) is set in the above described manner, it is conceivable that the stepping motor 53 may not have returned to the origin position thereof that corresponds to the initial excitation pattern (NO.) in the subsequent use due to friction produced in shafts or sliding parts of the diaphragm apparatus or due to deformation of linkages thereof. The present invention is characterized in that the diaphragm (the diaphragm apparatus 119)

can be stopped down with precision even in such a case. A diaphragm stop-down process of the present embodiment of the SLR camera system will be hereinafter discussed with reference to the timing chart shown in FIG. 15 and the flow chart shown in FIGS. 16A and 16B. In the illustrated embodiment, the origin-position detection process which detects that the slider 57 has moved by a predetermined distance in the stop-down direction from the origin position is performed at the beginning of the diaphragm stop-down process. Note, in the illustrated embodiment, the diaphragm stop-down process commences at the initial excitation pattern that is set in the origin-position initialization process.

Upon the commencement of the diaphragm stop-down process, firstly a stop-down step number is set (step S301). The stop-down step number represents the number of steps for rotating the stepping motor 53 that is required to move the slide lever 57 to a position corresponding to the set f-number. The f-number is determined by a conventional photometering operation and an exposure calculation process, and the stop-down step number to attain this f-number can be determined by calculation or from a data table. In the following descriptions of this embodiment, "rise or moving upward" means the upward movement of the slide lever 57 with the camera body 10 in normal position (in the upward direction with respect to FIG. 1), i.e., in the diaphragm stop-down direction, and that "moving downward" means the downward movement of the slide lever 57, i.e., movement in the diaphragm opening direction.

Before the stepping motor 53 is driven stepwise (excited to rotate stepwise), the output of the Hall sensor 65 is A/D converted to detect the position of the slide lever 57 as a detection value P10, and this detection value P10 is stored in memory (step S303). Subsequently, a rise-confirmation threshold value P11 is calculated from the following equation (step S305):

$$P11=P10+\Delta B'.$$

As mentioned above, ΔB' represents the variation (amount of variation) of the detection value per one step ΔB×0.9 that is detected in the origin position initialization process. ΔB' can alternatively be a value obtained by multiplying B/3 of the moving distance (stepwise moving distance per one step) of the slider 57 by a coefficient within the range of, e.g., 0.2 through 0.4.

Subsequently, the current excitation pattern (NO.) is set to the initial excitation pattern (0) in this embodiment (step S307). Thereafter, the stepping motor 53 is excited with the set current excitation pattern (0) (step S309). In this embodiment it is assumed that this excitation does not cause the stepping motor 53 to rotate (see FIG. 15). Subsequently, it is determined whether or not the current excitation pattern is (3) (step S311). If it is determined that the current excitation pattern is not (3) (if NO at step S311), the current excitation pattern (NO.) is incremented by one (step S313). If it is determined that the current excitation pattern is (3) (if YES at step S311), the current excitation pattern (NO.) is set to (0) (step S315). In this particular case, the current excitation pattern (0) is incremented by one, thus becoming (1).

Subsequently, control waits a fixed period of time t5 (ms)) (step S317), the output of the Hall sensor 65 is A/D converted and stored in memory as a provisional value AD_Temp (step S319) and it is determined whether or not the provisional value AD_Temp is equal to or less than the rise-confirmation threshold value P11 (step S321). If the provisional value AD_Temp is equal to or less than the rise-confirmation threshold value P11 (if YES at step S321), control returns to step S309.

Accordingly, the loop from steps S309 through S321 is repeated until the provisional value AD_Temp becomes greater than the rise-confirmation threshold value P11. In the case where the stepping motor 53 has not yet return to the origin position thereof, it is sometimes the case that the provisional value AD_Temp does not exceed the rise-confirmation threshold value P11 even by the first driving of the stepping motor 53 in the diaphragm stop-down direction. Even in this case, exciting the stepping motor 53 a plurality of times causes a detent position of the stepping motor 53 and one of the four excitation patterns (NO.) to coincide with each other, thus causing the stepping motor 53 to come to rotate stepwise in the diaphragm stop-down direction.

Upon the provisional value AD_Temp exceeding the rise-confirmation threshold value P11 (if NO at step S321), there onwards, the stepping motor 53 rotates in the diaphragm stop-down direction so that control comes out of the loop from steps S309 through S321 and proceeds to step S323.

Upon control entering the operation at step S323, control waits the fixed period of time t5 (ms)) (step S323) and the stepping motor 53 is excited with the current excitation pattern (NO.) (step S325). This excitation causes the stepping motor 53 to rotate one step in the diaphragm stop-down direction. Subsequently, it is determined whether or not the current excitation pattern is (3) (step S327). If it is determined that the current excitation pattern is not (3) (if NO at step S327), the current excitation pattern (NO.) is incremented by one (step S329). If it is determined that the current excitation pattern is (3) (if YES at step S327), the current excitation pattern (NO.) is set to (0) (step S331). Thereafter the stop-down step number is decremented by one (step S333) and it is determined whether or not the stop-down step number is 0 (step S335). If it is determined at step S335 that the stop-down step number is not 0 (if NO at step S335), control returns to step S323 to again perform the excitation operation at step S325, so that the stepping motor 53 is repeatedly excited unless the stop-down step number becomes 0. If it is determined at step S335 that the stop-down step number is 0 (if YES at step S335), control ends the diaphragm stop-down process.

In the above described diaphragm stop-down process, even if the stepping motor 53 does not return to the origin position thereof when the slide lever 57 returns to the origin position thereof, the stepping motor 53 rotates stepwise in the diaphragm stop-down direction, and the stepping motor 53 is additionally excited more than one time without decrementing the stop-down step number until the provisional value AD_Temp becomes greater than the rise-confirmation threshold value P11, and accordingly, the slide lever 57 is moved upward precisely from the origin position by a moving amount corresponding to the set stop-down step number. Consequently, the diaphragm apparatus 113 of the interchangeable lens 100, which is interlocked with the diaphragm operatively-associated rod 109, is stopped down to the position corresponding to the set f-number with precision.

The fixed period of time t5 (pulse rate) used in the diaphragm stop-down process is set shorter than the fixed period of time t1 (pulse rate) used in the origin-position initialization process to reduce the time required for the diaphragm stop-down process.

Although the stop-down step number starts being decremented from the moment the provisional value AD_Temp becomes greater than the rise-confirmation threshold value P11 in the above described embodiment, it is possible that the stop-down step number be decremented upon commencement of the diaphragm stop-down operation and that the number of steps through which the stepping motor 53 has been driven until the provisional value AD_Temp becomes greater than the rise-confirmation threshold value P11 be added as a drive correction step number to the stop-down step number having been decremented.

Additionally, in the above described embodiment, since the variation ΔB of the detection value per one step, which is detected in the vicinity of the origin position when the stepping motor 53 is driven in the diaphragm opening direction, is used in the calculation of the rise confirmation threshold value P11 in the origin-position initialization process, drive control can be performed with high precision.

Although the position of the diaphragm control rod 19 (the slider 57) in the sliding direction thereof is detected by the pair of magnets 64 (64a and 64b) and the Hall sensor 65 in the above illustrated embodiment, the position of the diaphragm control rod 19 (the slider 57) can be detected by any type of origin position detection sensor capable of detecting the relative or absolute position of the diaphragm control rod 19 (the slider 57) within a predetermined range. In addition, it is desirable for such a sensor to be a non-contact sensor; however, a contact type of sensor can also be used. Either type of sensor needs to be required to have a sufficient degree of resolution and accuracy to detect a moving distance shorter than the moving distance of the slider 57 by one step of movement of the stepping motor 53 with precision. The type of stepping motor to be used as a driving source of the diaphragm control mechanism is not limited to a particular type stepping motor such as the stepping motor 53.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A diaphragm control apparatus incorporated in a camera body, to which an interchangeable lens provided with a diaphragm apparatus is detachably attached, said diaphragm apparatus including a diaphragm operatively-associated rod for driving an adjustable diaphragm to open and shut said adjustable diaphragm, and said diaphragm control apparatus including a slider that is driven to move said diaphragm operatively-associated rod, said diaphragm control apparatus comprising:

a diaphragm control mechanism including a stepping motor and a lead screw which is driven to rotate by said stepping motor, wherein said slider is moved by rotation of said lead screw;

a resilient biaser which biases said slider toward an initial position at a movement extremity of said slider, wherein said slider is allowed to move to an initial position corresponding to an initial position of said diaphragm apparatus via said diaphragm operatively-associated rod by rotating said lead screw and said stepping motor when said stepping motor is in a free state with said interchangeable lens attached to said camera body;

a position detector for detecting a position of said slider; and a controller which excites said stepping motor to rotate said stepping motor stepwise by repeating a plurality of excitation patterns, wherein, when driving said stepping motor by a predetermined number of steps in a direction to move said slider away from said origin position against a biasing force of said resilient biaser, said controller detects a position of said slider before driving said stepping motor stepwise as said origin position via said position detector, and thereafter detects a stepping position of said slider to compare said stepping position with said origin position each time said stepping motor is driven by one step, and counts said number of steps based from the moment at which said stepping position of said slider exceeds a predetermined position in said direction to move said slider away from said origin position against said biasing force of said resilient biaser.

2. The diaphragm control apparatus according to claim 1, wherein said predetermined position in said direction to move said slider away from said origin position is located at a position less than a predetermined distance from said origin position, said predetermined distance being shorter than a moving distance of said slider per one step of said stepping motor.

3. The diaphragm control apparatus according to claim 2, wherein said controller determines said moving distance of said slider per one step of said stepping motor based on positions of said slider detected via said position detector while moving said slider stepwise away from said origin position against said biasing force of said resilient biaser or toward said origin position.

4. The diaphragm control apparatus according to claim 1, wherein said predetermined position in said direction to move said slider away from said origin position is located at a position less than a predetermined distance from said origin position, said predetermined distance being shorter than two-tenths through four-tenths of a moving distance of said slider per one step of said stepping motor.

5. The diaphragm control apparatus according to claim 4, wherein said controller determines said moving distance of said slider per one step of said stepping motor based on positions of said slider detected via said position detector while moving said slider stepwise away from said origin position against said biasing force of said resilient biaser or toward said origin position.

6. The diaphragm control apparatus according to claim 1, wherein said controller sets the initial excitation pattern for a subsequent diaphragm control based on the excitation pattern of said stepping motor when said slider exceeds a predetermined position.

7. The diaphragm control apparatus according to claim 1, wherein said position detector comprises at least one magnet and a Hall sensor.

8. The diaphragm control apparatus according to claim 7, wherein said slider is supported by a slide shaft that extends parallel to said lead screw so that said slider is freely slidable thereon, and wherein said magnet is installed onto said slider at a position between said lead screw and said slide shaft.

9. The diaphragm control apparatus according to claim 1, wherein said diaphragm apparatus of said interchangeable lens comprises a diaphragm ring, positioned coaxially with an optical axis of said interchangeable lens to be rotatable about said optical axis, said diaphragm operatively-associated rod being integrally formed with said diaphragm ring to project rearward from a rear end of said interchangeable lens, and wherein said diaphragm ring is continuously biased by a biaser in a direction to stop down an aperture formed by diaphragm blades of said diaphragm apparatus.

* * * * *